US008838721B2

(12) United States Patent
Nemoto et al.

(10) Patent No.: US 8,838,721 B2
(45) Date of Patent: Sep. 16, 2014

(54) FILE SHARING SYSTEM AND FILE SHARING METHOD

(75) Inventors: Jun Nemoto, Yokohama (JP); Yohsuke Ishii, Yokohama (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 13/126,066

(22) PCT Filed: Apr. 15, 2011

(86) PCT No.: PCT/JP2011/002228
§ 371 (c)(1),
(2), (4) Date: Apr. 26, 2011

(87) PCT Pub. No.: WO2012/140701
PCT Pub. Date: Oct. 18, 2012

(65) Prior Publication Data
US 2012/0265836 A1      Oct. 18, 2012

(51) Int. Cl.
*G06F 15/16* (2006.01)
*G06F 17/30* (2006.01)

(52) U.S. Cl.
CPC .... *G06F 17/30153* (2013.01); *G06F 17/30168* (2013.01); *G06F 17/30131* (2013.01)
USPC .......................................... 709/208; 709/211

(58) Field of Classification Search
USPC ......... 709/201, 203, 208, 211, 216, 219, 245, 709/246; 707/609, 610, 623, 705
See application file for complete search history.

(56) References Cited

U.S. PATENT DOCUMENTS

| 6,341,311 | B1 | 1/2002 | Smith et al. | |
|---|---|---|---|---|
| 2003/0018732 | A1 | 1/2003 | Jacobs et al. | |
| 2006/0059253 | A1* | 3/2006 | Goodman et al. | 709/223 |
| 2006/0129537 | A1 | 6/2006 | Torii et al. | |
| 2007/0180305 | A1* | 8/2007 | Fujimoto | 714/6 |
| 2007/0185938 | A1* | 8/2007 | Prahlad et al. | 707/204 |
| 2009/0138808 | A1 | 5/2009 | Moromisato et al. | |
| 2009/0150462 | A1* | 6/2009 | McClanahan et al. | 707/204 |
| 2010/0100529 | A1* | 4/2010 | Erofeev | 707/610 |
| 2010/0185938 | A1* | 7/2010 | Rising et al. | 715/234 |
| 2010/0332401 | A1* | 12/2010 | Prahlad et al. | 705/80 |
| 2010/0332818 | A1* | 12/2010 | Prahlad et al. | 713/150 |
| 2010/0333116 | A1* | 12/2010 | Prahlad et al. | 719/328 |
| 2011/0061046 | A1* | 3/2011 | Phillips | 717/176 |
| 2012/0246206 | A1* | 9/2012 | Yamada et al. | 707/827 |

FOREIGN PATENT DOCUMENTS

| JP | 2005-129018 A | 5/2005 |
|---|---|---|
| JP | 2005-526298 A | 9/2005 |
| WO | WO 03009092 A2 * | 1/2003 |

* cited by examiner

*Primary Examiner* — Thai Nguyen
*Assistant Examiner* — Phyllis Book
(74) *Attorney, Agent, or Firm* — Volpe and Koenig, P.C.

(57) ABSTRACT

In a computer system according to an embodiment of the present invention, a first slave server includes copy management information associating a master file system identifier with an identifier of a slave server including a copy of the master file system identified by the master file system identifier. The first slave server acquires a copy of a part of a master file system. The copy includes a stub-state object (file or directory). The first slave server searches the copy management information for a slave server to be queried regarding information for materializing the stub-state object. If the slave server to be queried includes the information for materialization, the first slave server materializes the stub-state object using the information for materialization acquired from the queried slave server.

13 Claims, 19 Drawing Sheets

Fig. 8

| VERSION MANAGEMENT TABLE 800 | | |
|---|---|---|
| REPOSITORY ID 810 | VERSION ID 820 | CREATION DATE/TIME 830 |
| REPOS00 | VERSION2 | 10/10/2010 12:34:56 |
| REPOS00 | VERSION3 | 10/17/2010 12:34:56 |
| REPOS01 | VERSION2 | 10/07/2010 12:34:56 |

Fig. 9

| | | | | | | |
|---|---|---|---|---|---|---|
| | | | WORKING COPY MANAGEMENT TABLE 900 | | | |
| 910 | 920 | 930 | 940 | 950 | 960 | 970 |
| SITE ID | SERVER ID | REPOSITORY ID | VERSION ID | WORKING COPY ID | CHECK-OUT DATE/TIME | PERFORMANCE INFORMATION |
| INDIA | SERVER99 | REPOS01 | VERSION02 | /MNT/COPY00 | 10/21/2010 10:40:21 | 10ms |
| JAPAN | SERVER01 | REPOS00 | VERSION03 | /MNT/COPY01 | 10/30/2010 10:40:21 | 0.5ms |
| JAPAN | SERVER00 | REPOS00 | VERSION03 | /MNT/COPY02 | 10/15/2010 10:40:21 | 0.5ms |

Fig. 10

DIRECTORY STRUCTURE INFORMATION (1000)

| OBJECT ID (1010) | OBJECT NAME (1020) | OBJECT TYPE (1030) |
|---|---|---|
| 838861 | OBJ00 | FILE |
| 838862 | OBJ01 | FILE |
| 838863 | OBJ02 | DIRECTORY |

FILE SHARING SYSTEM AND FILE SHARING METHOD

TECHNICAL FIELD

This invention relates to a file sharing system and a file sharing method, and more particularly, to a caching technology used for sharing a file on a master server.

BACKGROUND ART

In software development, source code files or computer aided design (CAD) data files are sometimes placed on file servers and shared to perform distributed development at locations around the world. Most of such file servers include a version management system.

Therefore, in a general flow of development, a developer at each of the locations checks out a snapshot at one given point in time (for example, a given version of a shipped product) of a repository on the file server, modifies only a file that needs a bug fix, and after compilation/verification of modification, checks in the modified file to the repository in a data center to newly create a snapshot (raise the version). Such distributed development raises a problem of a network delay because it is necessary to check out a large number of files from the file server placed in a remote site.

As a technology for solving the above-mentioned problem of the network delay, there is an on-demand copy technology. In the technology, instead of checking out all the files from the file server, a directory or file to which access has been made is first checked out as a directory or file that retains only meta-data called "stub".

Further, in on-demand copy, when the developer actually opens the directory or reads or writes the file, the directory or file is copied on demand from the file server (materialization of a stub). The on-demand copy technology can reduce communications performed between a terminal of the developer and the file server in the remote site to a minimum, which can reduce an influence of the network delay.

In addition, as a technology for realizing high-speed access, there is known a proxy server that connects an internal network and an external network. The proxy server, for example, exists between a client in the internal network and a server in the external network and relays communications between the client and the server.

The proxy server caches the file requested by the client from the server to thereby return the cached file in place of the server when another client requests the same file afterward. For example, by locating the proxy server in a local area network (LAN), once a file is cached, a client within the LAN can acquire the file with high speed without directly making a query to a server outside the LAN.

In addition, as one of caching technologies for the proxy server, there is a distributed caching technology. In the distributed caching technology, a plurality of proxy servers are provided, and if the proxy server that has received a request does not have the file cached therein, the proxy server queries another proxy server as to whether or not the another proxy server retains a cache file thereof.

If the cache file exists on a given proxy server, by acquiring the file from the given proxy server, it is possible to reduce the number of times to communicate to an original server exhibiting a large network delay. A protocol for verifying a presence/absence of the cache between the proxy servers is standardized as an Internet cache protocol (ICP).

With regard to the proxy server using the ICP, as the number of cooperative proxy servers increases, it is possible to improve a cache hit rate, however network traffic increases because each of the proxy servers queries the presence/absence of the cache file from all the other proxy servers. Therefore, a technology for reducing the number of times to make a query about the cache file between the proxy servers is being under development.

For example, Patent Literature 1 cited below discloses a method for suppressing the number of times to make a query about the cache file between the proxy servers to at most one by using a deterministic algorithm to uniquely derive the proxy server having a given file cached therein from a proxy server name and a uniform resource locator (URL) indicating a place that stores the file.

CITATION LIST

Patent Literature

PTL 1: U.S. Pat. No. 6,341,311 B1

SUMMARY OF INVENTION

Technical Problem

However, specific studies have not been performed so far regarding simultaneous application, to a given system, of the on-demand copy technology used for a system such as a version management system and the proxy server technology for mediating between networks. Further, a repository in a data center, which is a file system including directories and files, needs specific studies to be performed regarding distributed caching of data including directories and files, in the case of the system such as a version management system.

In addition, the distributed caching technology disclosed in Patent Literature 1 raises a problem. In the distributed caching technology of Patent Literature 1, a server that stores a cache file is uniquely decided from a proxy server name and a URL, and hence a storage destination of the cache file is necessarily one proxy server. Accordingly, it is highly probable that the proxy server that has received a query from a client does not retain the cache file, and in many cases, the presence/absence of the cache file needs to be queried of another proxy server. Therefore, a response to the client is delayed.

This invention has been made in view of the above-mentioned circumstances, and an object thereof is to reduce a network delay in a processing for sharing a file of a file system which is master data.

Solution to Problem

A file sharing system according to an aspect of the present invention comprises a master server configured to provide one or more master file systems each including a directory and a file each being an object, and one or more slave servers each configured to acquire a copy file system of a part or whole of a master file system provided by the master server. A first slave server in the one or more slave servers includes copy management information associating a master file system identifier with an identifier of a slave server including a copy file system of a part or whole of a master file system identified by the master file system identifier. The first slave server acquires a first copy file system of a part of a first master file system in the one or more master file systems, the first copy file system including a stub-state object. The first slave server, using an identifier of the first master file system, searches the copy management information for a slave server to be queried regarding cached information for materializing the stub-state object. On condition that the search result indicates a slave server to be queried in the one or more slave servers, the first slave server queries the slave server to be queried regarding the cached information for materialization. On condition that the slave server to be queried includes the information for materialization, the first slave server materializes the stub-state object using the information for materialization acquired from the queried slave server.

Advantageous Effects of Invention

According to an aspect of the present invention, it is possible to reduce the network delay in the processing for sharing a file of the file system which is master data.

BRIEF DESCRIPTION OF DRAWINGS

FIG. 8 is a diagram illustrating an internal configuration of a version management table in an embodiment of the present invention.

FIG. 9 is a diagram illustrating an internal configuration of a working copy management table in an embodiment of the present invention.

FIG. 10 is a diagram illustrating an internal configuration of directory structure information in an embodiment of the present invention.

DESCRIPTION OF EMBODIMENTS

Hereinafter, an embodiment for carrying out this invention is described. To make the description clearer, the following descriptions and drawings are omitted and simplified as appropriate. Further, in the respective drawings, the same components are denoted by the same reference symbol, and to make the description clearer, duplicate descriptions are omitted as necessary.

A configuration example to be described in this embodiment is a file sharing system having a version management function. This system is mainly used for software development. A server (slave server) acquires a copy (working copy) of a part of a repository (file system) stored on a master server in response to a request received from a client.

The copied file system (working copy) includes a stub-state file or directory. The stub-state file or directory includes meta-information but does not include entity information thereon. To materialize the stub-state file or directory, the server queries the own server or another server as to a presence/absence of a cache of necessary information.

The server references a working copy management table in the query for the materialization. The working copy management table manages the working copy being the copied file system checked out from the repository on the master server. The working copy management table is shared among the servers. The server searches the working copy management table for a server to be queried regarding the presence/absence of the cached file or directory for the materialization of the stub-state file or directory.

According to this configuration, it is possible to retain the cache data on the file and directory of the repository on a plurality of servers and share the cache data among the servers, and to reduce the number of times to make a query about the cache data between the servers.

In a working copy management table, only one entry is assigned to one working copy. The cache data is thus managed per working copy to thereby reduce the work management table in size and reduce amounts of processing and data transfer for managing and sharing (synchronizing) the work management table.

This embodiment is described below by mainly taking an example in which a working copy is checked out from the master server that provides a file service based on the version management function to read/write the file in the working copy. However, this embodiment is merely an example for realizing this invention, and does not limit the technical scope of this invention.

Figure 1:
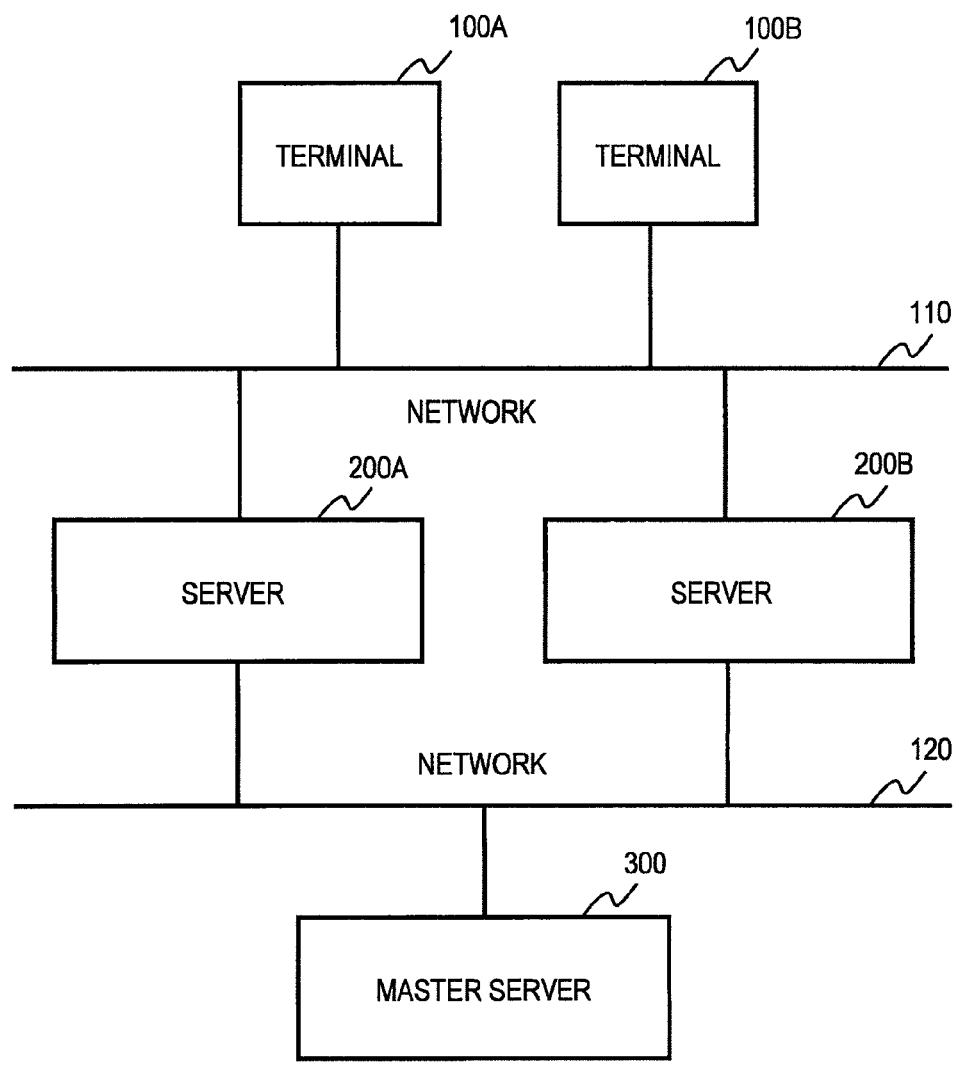
FIG. 1 is a diagram illustrating an example configuration of a file sharing system in an embodiment of the present invention.

FIG. 1 is a block diagram illustrating a schematic configuration of the file sharing system according to this embodiment. The file sharing system includes terminals 100A and 100B, servers 200A and 200B that are coupled to the terminals 100A and 100B via a network 110, and a master server 300 that is coupled to the servers 200A and 200B via a network 120.

The number of terminals, the number of servers, and the number of master servers that are illustrated in FIG. 1 are examples, and the respective numbers are set to appropriate values according to the design of the system. For example, the system can include a plurality of master servers. The terminals 100A and 100B have the same configuration, and a terminal 100 means an arbitrary one of the terminals 100A and 100B hereinbelow. The servers 200A and 200B have the same configuration, and a server 200 means an arbitrary one of the servers 200A and 200B hereinbelow.

The terminal 100 is a computer that is used by a user (developer) who logs in to the server 200 to use a version management service provided by the master server 300 and the server 200. The server 200 is a computer that cooperates with the master server 300 to provide the user with the version management service.

The master server 300 is a computer that provides a file sharing service, a check-in service, and a check-out service that are necessary for the server 200 to provide the user with the version management service.

The network 110 is a network that couples the terminal 100 and the server 200 to each other. The network 110 is, for example, a local area network (LAN). The network 120 is a network that couples the server 200 and the master server 300 to each other. The network 120 is, for example, a wide area network (WAN) or the Internet.

Figure 2:
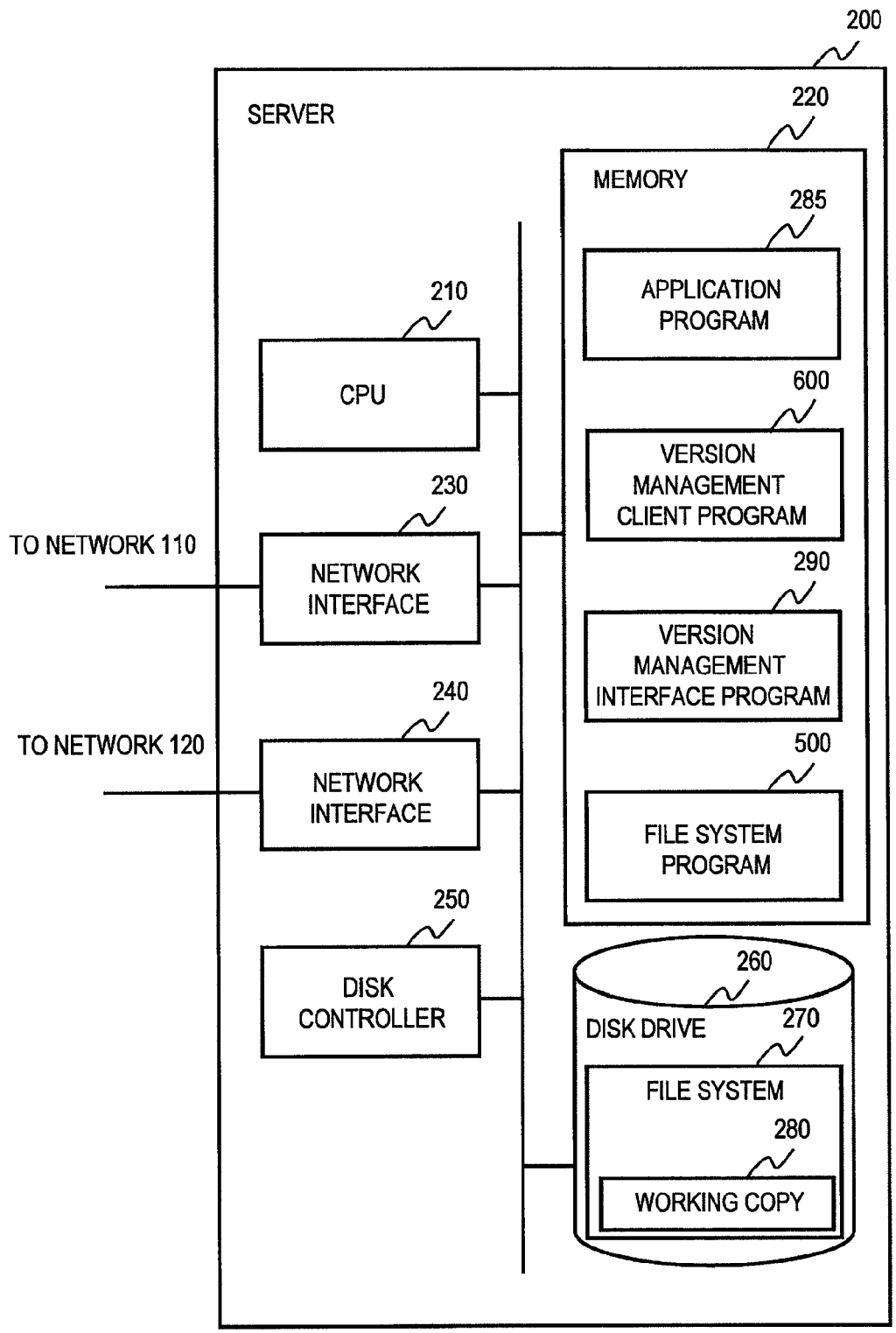
FIG. 2 is a diagram illustrating an internal configuration of a server in an embodiment of the present invention.

FIG. 2 is a block diagram illustrating a schematic configuration of the server 200. As illustrated in FIG. 2, the server 200 includes a memory 220 being a primary storage device that stores a program and data and a CPU 210 being a processor that executes the program stored in the memory 220. The processor may include one or a plurality of cores, and may be formed of a plurality of packages. In this respect, the same applies to other computers.

The server 200 is a computer further including a network interface 230 used for communicating to the terminal 100 and another server 200, a network interface 240 used for communicating to the master server 300, a disk drive 260 being a secondary storage device including a nonvolatile storage medium, and a disk controller 250 that controls an input/output to/from the disk drive 260, which are coupled to one another via an internal communication channel (for example, bus).

The disk drive used by the server 200 may be directly coupled to the server 200 in the same manner as the disk drive 260, or the server 200 may be coupled to the disk drive on a disk array apparatus, which is coupled to a storage area network (SAN), via a disk interface.

Programs and data are stored in the memory 220 of the server 200. The programs and data include, for example, an application program 285, a version management client program 600, a version management interface program 290, and a file system program 500. Typically, the program is loaded from the disk drive 260 into the memory 220, and a set of the disk drive 260 and the memory 220 also constitute one storage device. In those respects, the same applies to other computers.

The application program 285 is, for example, an editor used by the user who has logged in to the server 200 to read/write the file. The version management client program 600 is a program that allows the user who has logged in to the server 200 to check out the working copy from the master server 300 and check in the working copy.

The version management interface program 290 is a program for providing an interface that allows the user to check out and check in the working copy. The version management interface program 290 also provides an interface that allows the user who has a management authority for a repository 380 on the master server 300 to reference a list of working copies that have been currently checked out and set a policy for searching for the working copy to retrieve the cache data on a given file.

The file system program 500 is a program for managing a file system 270 stored on the disk drive 260. The disk controller 250 inputs/outputs the data stored on the disk drive 260, for example, per block based on the input/output request for each of various programs stored in the memory 220.

The disk drive 260 stores data to be read/written by each of the various programs stored in the memory 220 in addition to the above-mentioned programs. A working copy 280 is stored on the disk drive 260. The working copy 280 is processed after being loaded from the disk drive 260 into the memory 220.

Each of the above-mentioned programs is executed by the processor to thereby perform a predetermined processing by using the memory 220 and a port. The following description with the program being used as the subject of a sentence may be replaced by the description with the processor being used as the subject of the sentence. Further, the processing executed by the program is a processing performed by the computer and computer system on which the program operates. In this respect, the same applies to program execution on another computer.

Figure 3:
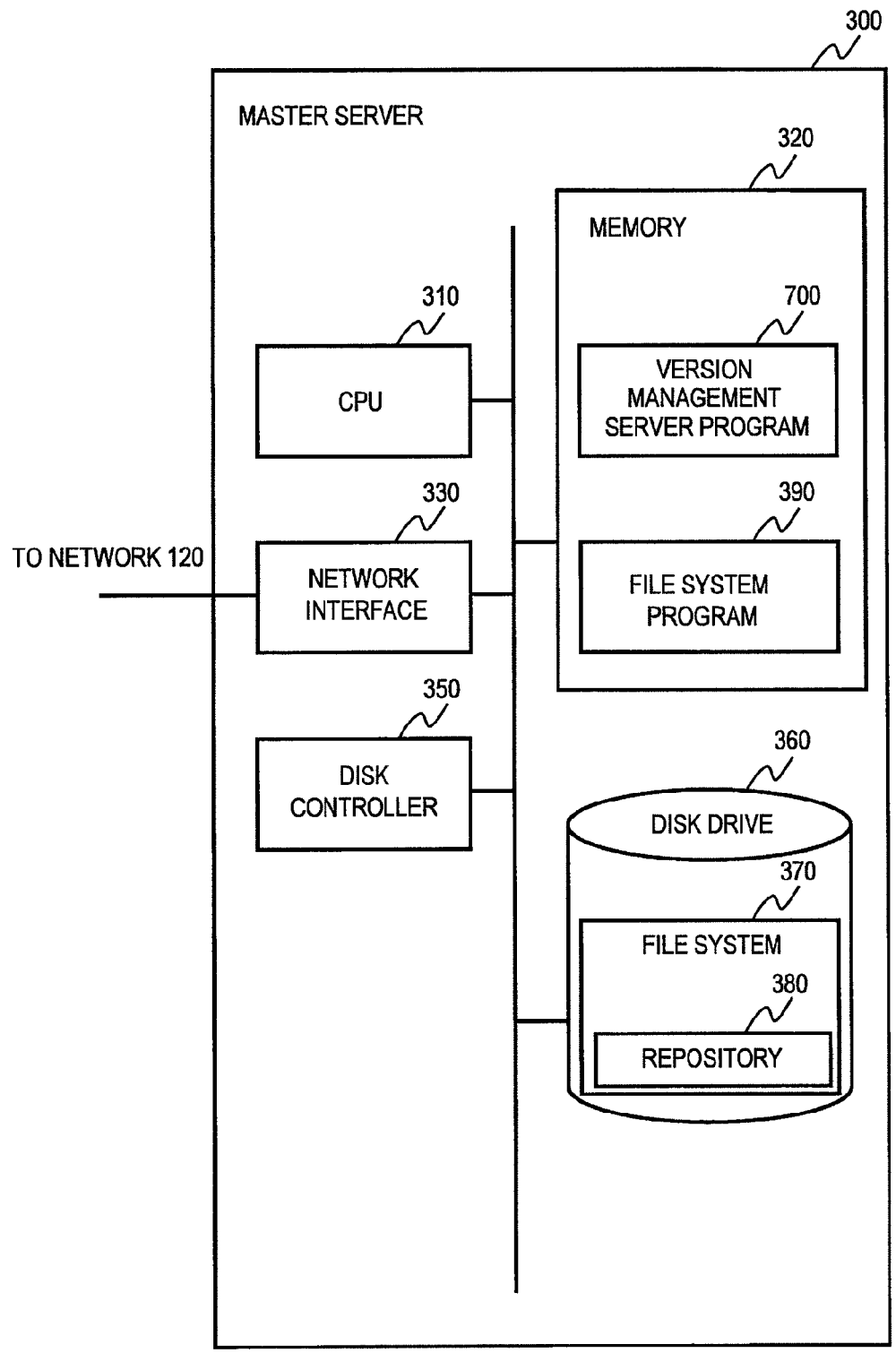
FIG. 3 is a diagram illustrating an internal configuration of a master server in an embodiment of the present invention.

FIG. 3 is a block diagram illustrating a schematic configuration of the master server 300. As illustrated in FIG. 3, the master server 300 is a computer including a memory 320 that stores a program and data, a CPU 310 being a processor that executes the program stored in the memory 320, a network interface 330 used for communicating to the server 200, a disk drive 360, and a disk controller 350 that controls an input/output to/from the disk drive 360, which are coupled to one another via an internal communication channel (for example, bus).

The program and data are stored in the memory 320 of the master server 300. The program and data include, for example, a version management server program 700 and a file system program 390.

The version management server program 700 is a program that provides the server 200 with the file sharing service, the check-in service, and the check-out service. The file system program 390 is a program for managing a file system 370 stored on the disk drive 360.

The disk controller 350 inputs/outputs the data stored on the disk drive 360, for example, per block based on an input/output request for each of various programs stored in the memory 320. The disk drive 360 stores data to be read/written by each of the various programs stored in the memory 320. The repository 380 is stored on the disk drive 360.

It should be noted that the disk drive used by the master server 300 may be directly coupled to the master server 300 in the same manner as the disk drive 360, or the master server 300 may be coupled to the disk drive on the disk array apparatus, which is coupled to the SAN, via the disk interface.

The terminal 100 has a basic configuration as a computer, and includes input/output devices, a memory, and a processor that operates according to a program stored in the memory. Typically, the input device is a mouse and a keyboard, and the output device is a display. The terminal 100 may include a nonvolatile secondary storage device, but does not necessarily include the nonvolatile secondary storage device. The typical secondary storage device is a magnetic disk drive. The user logs in to the server 200 through the terminal 100, and uses the application program 285 stored on the server to process the working copy 280 through the terminal 100.

In this configuration, the user uses a client terminal 100 to access the server 200. Alternatively, the server 200 may include an input device and a display device like the terminal 100, which may be used by the user to operate the server 200.

Figure 4:
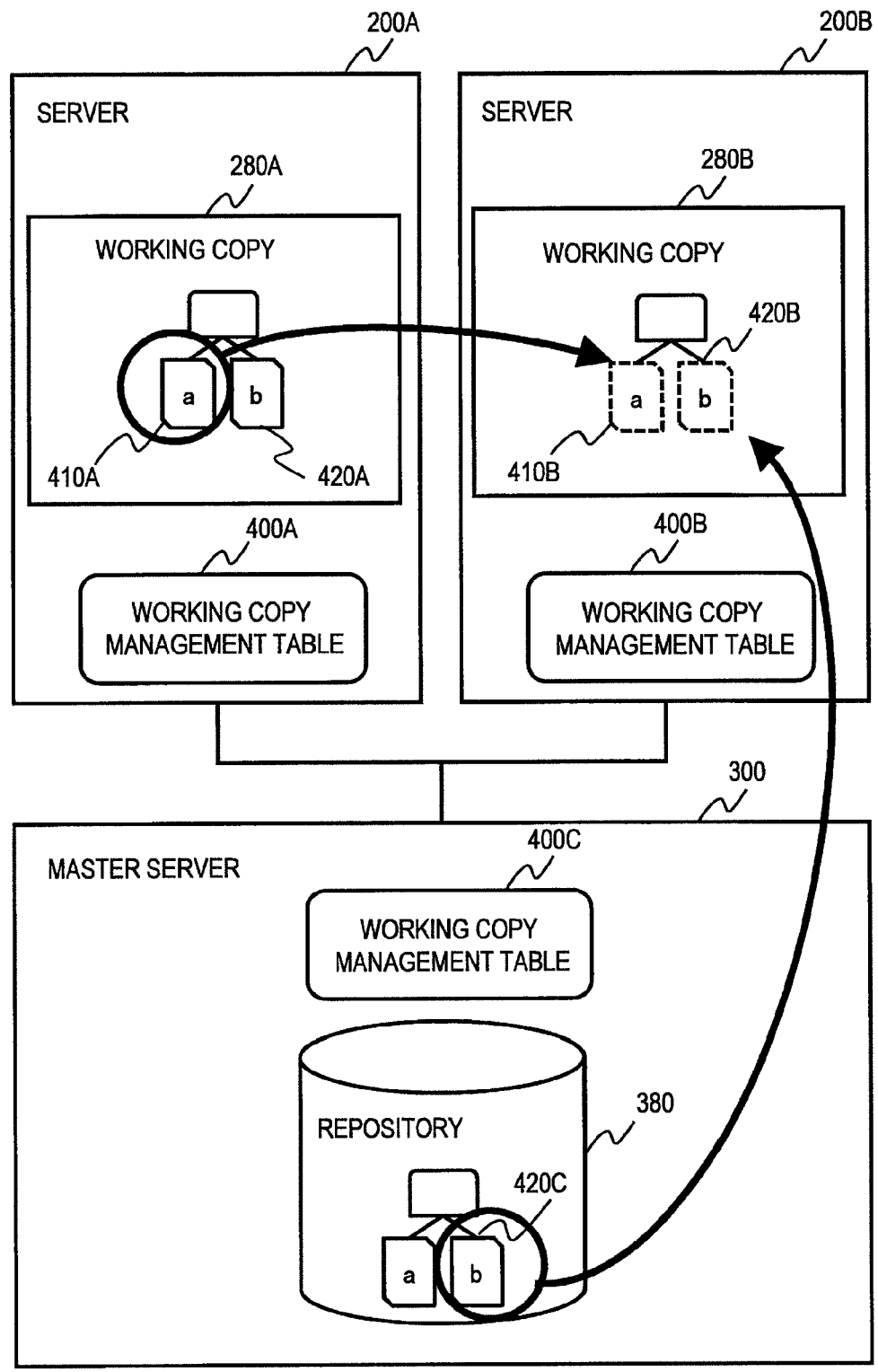
FIG. 4 is a diagram schematically illustrating materialization of a stub file in an embodiment of the present invention.

FIG. 4 is a diagram schematically illustrating a flow of data in the materialization of the stub-state file (stub of the file) according to this embodiment. This system uses the stub of the directory and the stub of the file. In the present description, an "object" is used as a word including both the directory and the file.

The stub includes positional information (reference information) on the object and the meta-information (attribute information) thereon, but does not include entity information thereon. For example, the stub of the directory not only includes the positional information (pointer) but also includes, as the attribute information (meta-information), information such as a directory name, a directory size, a time stamp, and an access authority. The stub of the file not only includes the positional information (pointer) but also includes, as the attribute information (meta-information), information such as a file name, a file size, and an access authority. A specific structure of the stub is described later with reference to FIG. 11.

The server 200A includes a working copy 280A and a working copy management table 400A. The working copy 280A includes a directory and two files 410A and 420A in the directory. In the same manner, the server 200B includes a working copy 280B and a working copy management table 400B. The working copy 280B includes a directory and two files 410B and 420B in the directory.

The servers 200A and 200B are each a slave server including the working copy. The working copy management tables 400A and 400B store the same information as that of a working copy management table 400C on the master server 300. The working copy management table is described later in detail.

The working copy 280A on the server 200A has been checked out from the repository 380 on the master server 300. Further, the directory, the file 410A, and the file 420A within the working copy 280A have already been materialized from the stub, and a change has been made to the file 420A. No change has been made to the file 410A.

In the same manner, the working copy 280B on the server 200B has been checked out from a repository 380 on a master server 300. However, the directory has been materialized, but the file 410B and the file 420B within the working copy 280B are both stub-state files.

For example, when the user who has logged in to the server 200B reads the stub-state file 410B or the file 420B by the application program 285 such as an editor, the server 200B references the working copy management table 400B, recognizes that the server 200A retains the working copy 280A checked out from the same repository 380 and verifies whether or not there is a cache on the server 200A by.

The file 410A on the server 200A has been materialized from the stub with no change having been made thereto, and therefore can be used as a cache file. Therefore, the server 200B copies the file 410A from the server 200A. On the other hand, the file 420A on the server 200A has been materialized with a change having been made thereto, and therefore cannot be used as the cache file. Therefore, the server 200B copies a file 420C from the master server 300.

Figure 5:
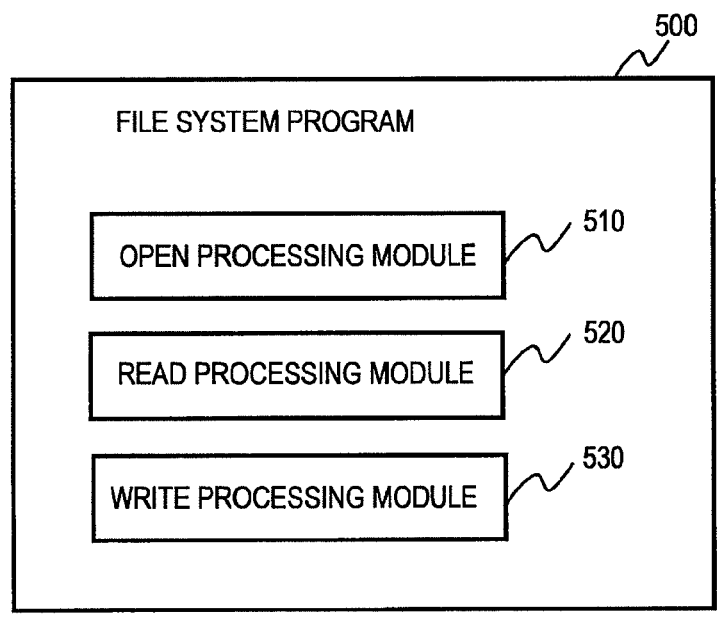
FIG. 5 is a diagram illustrating an internal configuration of a file system program in an embodiment of the present invention.

Hereinafter, the program operating in the file sharing system is described with reference to FIGS. 5 to 7. FIG. 5 is a block diagram illustrating a functional configuration of the file system program 500 of the server 200. As illustrated in FIG. 5, the file system program 500 includes an OPEN processing module 510, a READ processing module 520, and a WRITE processing module 530.

When the user who has logged in to the server 200 by operating the terminal 100 uses the application program 285 such as an editor to open the directory or file stored in the file system 270, the application program 285 issues an OPEN request to the file system program 500. The OPEN processing module 510 is executed by the CPU 210 of the server 200 with the OPEN request as a trigger.

When given a path name to the directory or file, the OPEN processing module 510 prepares for reading the directory or reading/writing the file, and returns a descriptor for identifying the directory or file that has been opened to the application program 285 that has issued the OPEN request. Further, the OPEN processing module 510 performs a materialization processing for the stub if the directory to be opened within the file system 270 is in a stub state.

In the stub materialization processing, the entity information on the file or directory (contents of the file or structure information on the directory) is acquired from the position indicated by the positional information in the stub and written to the stub (stub-state file or directory) to generate the materialized file or directory. The stub materialization processing is described later in detail with reference to FIG. 17.

When the user reads the file stored in the file system 270 through the application program 285, the application program 285 issues a READ request to the file system program 500. The READ processing module 520 is executed by the CPU 210 of the server 200 with the READ request as a trigger.

The READ processing module 520 uses the descriptor obtained as a result of executing the OPEN processing module 510 to access the directory or file and read the data, and returns the data to the application program 285 that has issued the READ request. Further, if the file to be read within the file system 270 is in the stub state, the READ processing module 520 performs the stub materialization processing therefore.

When the user performs writing to the file stored in the file system 270 through the application program 285, the application program 285 issues a WRITE request to the file system program 500. The WRITE processing module 530 is executed by the CPU 210 of the server 200 with the WRITE request as a trigger.

The WRITE processing module 530 uses the descriptor obtained as a result of executing the OPEN processing module 510 to access the file and write the data, and returns the result to the application program 285 that has issued the WRITE request. Further, if the file to be written is in the stub state, WRITE processing module 530 performs the stub materialization processing for the file within the file system 270.

Figure 6:
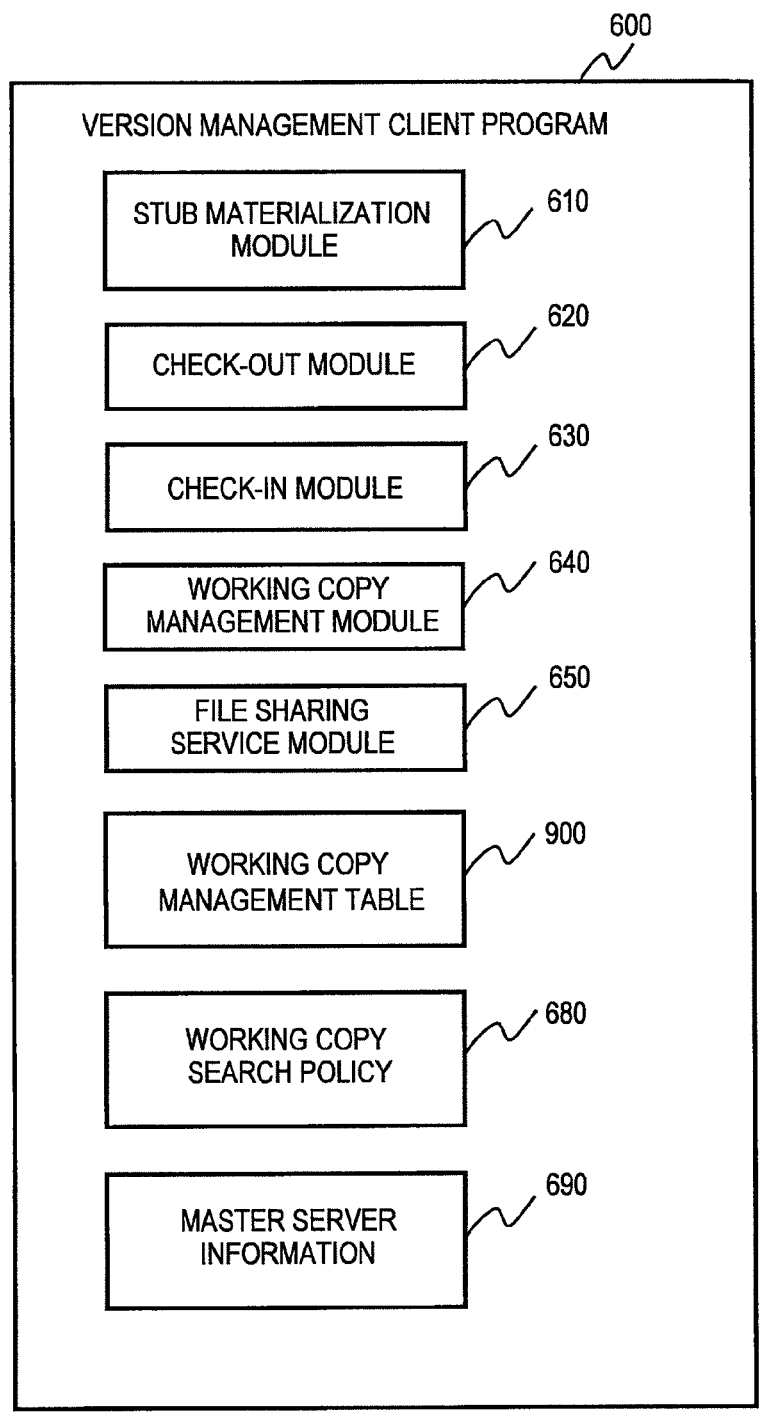
FIG. 6 is a diagram illustrating an internal configuration of a version management client program in an embodiment of the present invention.

FIG. 6 is a block diagram illustrating a functional configuration of the version management client program 600 of the server 200. As illustrated in FIG. 6, the version management client program 600 includes a stub materialization module 610, a check-out module 620, a check-in module 630, a working copy management module 640, a file sharing service module 650, a working copy management table 900, a working copy search policy 680, and master server information 690.

The stub materialization module 610 is executed by the CPU 210 of the server 200 in response to the request from the file system program 500 on the own server 200 or another server 200. Based on the working copy search policy 680, the stub materialization module 610 searches the working copy management table 900, and if there is a matched entry, queries the presence/absence of the cached object from the own server 200 or another server 200.

If the materialized file or directory that can be used has been cached, the stub materialization module 610 acquires the materialized file or directory from the server 200. If no materialized file or directory has been cached, the stub materialization module 610 acquires (entity information on) the file or directory from the master server 300, and materializes the stub-state file or directory.

The check-out module 620 is executed by the CPU 210 of the server 200 with a check-out request transmitted by the user via the version management interface program 290 as a trigger. The check-out module 620 transmits the check-out request, which indicates which version of which repository is to be checked out as the working copy, to the master server 300. The check-out module 620 may further specify a specific directory within the repository.

In response to the check-out request that specifies the repository and the version, the check-out module 620 acquires structure information on a root directory of the repository 380 from the master server 300, and based on the structure information, creates the stub-state file and directory in the root directory of the working copy 280.

In this embodiment, the top directory of a working copy (in this embodiment, the root directory of the repository) is materialized by being checked out. However, in the checking out, only the stub of the top directory may be created, and according to the subsequent user operation, the file system program 500 may materialize the stub-state directory.

The check-out module 620 adds a new entry to a working copy management table 770 (see FIG. 7) on the master server 300 concomitantly with the checking out of the working copy. In addition, the check-out module 620 acquires the working copy management table 770, and updates the working copy management table 900 on the server 200.

The check-in module 630 is executed by the CPU 210 of the server 200 with a check-in request transmitted by the user via the version management interface program 290 as a trigger. The check-in module 630 creates a list of files and directories that have been updated within the working copy 280. Then, the check-in module 630 transmits the list to the master server 300 as the check-in request, and verifies whether or not the same file has been updated by another user.

When such a conflict occurs, the check-in module 630 displays an alert on the terminal 100 via the version management interface program 290, and waits. When the user who has received the alert manually resolves the conflict by, for example, merging files or selecting a file to be kept in the repository, the check-in module 630 copies the updated file and directory to the master server 300.

The working copy management module 640 is executed by the CPU 210 of the server 200 with a request received from the check-out module 620 as a trigger. Further, on other occasions, the working copy management module 640 is periodically executed by the CPU 210 of the server 200.

The working copy management module 640 issues a working copy management table synchronization request to the master server 300 in response to a preset event (for example, a predetermined lapse of time), and synchronizes the working copy management table 770 on the master server 300 and the working copy management table 900 on the server 200.

In other words, the working copy management module 640 updates the working copy management table 900 so as to agree with the working copy management table 770 on the master server 300. Further, the working copy management module 640 acquires performance information on each working copy and records it in the working copy management table 900. The performance information on the working copy indicates access performance with respect to the working copy. The performance information is described later in detail with reference to FIG. 9.

The file sharing service module 650 is executed by the CPU 210 of the server 200 with a cached object (cached file or directory) presence/absence verifying request or an object acquisition request received from the stub materialization module 610 as a trigger. The stub materialization module 610 queries information for the materialization according to the working copy search policy 680. The working copy search policy 680 is described later in detail.

The file sharing service module 650 receives the cached object presence/absence verifying request and the object acquisition request not only from the stub materialization module 610 of the own server 200 but also from the stub materialization module 610 of another server 200 via the network interface 230.

When the file sharing service module 650 receives the cached object presence/absence verifying request, if the object (file or directory) to be verified is a materialized object and is not updated, the file sharing service module 650 returns "cached object present".

If the object to be verified is a stub-state object or is updated, the file sharing service module 650 returns "cached object absent". When receiving the object acquisition request, the file sharing service module 650 returns the cached object.

The working copy management table 900 is a table for managing the working copy 280 checked out to the server 200. The working copy search policy 680 defines the policy used when the stub materialization module 610 searches the working copy management table 900. By setting the working copy search policy 680, the user (developer or administrator) can set a search range for the cached object. In this configuration, the user can change the version of the working copy 280 and the server 200 as factors that define the search range.

For example, by setting the search range regarding the version so that the working copies of all the versions in the same repository are included in the search range irrespective of the version of the working copy, the search range for the cached object becomes wide. However, the search range includes the working copies of different versions, and hence data that cannot be used as the cached object increases. This increases the queries required until a search target is acquired, which causes a reduction in search processing efficiency and a network delay.

By setting the search range regarding the server so that all the servers are included in the search range, it is possible to increase a cache hit rate. However, it becomes necessary to query the presence/absence of the cached object from the server 200 located in a remote site as far as the master server 300 from a network point of view, and it becomes more probable that the reduction in search processing efficiency and the network delay are caused.

Further, in this configuration, the working copy search policy 680 also retains information that defines (an upper limit value of) the number of queries about the presence/absence of the cached object. For example, if the defined number is two, the stub materialization module 610 queries the presence/absence of the cached object from the two servers 200. As the number becomes larger, the cache hit rate increases, while network traffic increases.

If the number of entries that match another condition of the working copy search policy 680 is larger than the above-mentioned number, the stub materialization module 610 preferably uses performance information 970 to select an entry having the highest performance. Accordingly, necessary information can be acquired in the shortest time (with the highest speed). The performance information 970 is described later in detail with reference to FIG. 9.

Appropriate conditions in terms of design are selected as conditions that can be set in the working copy search policy 680. In a preferred configuration, all the above-mentioned conditions can be set, but one part of those or conditions different from those may be able to be set.

The user (developer or administrator) can set the working copy search policy 680 by using a working copy search policy setting screen provided by the version management interface program 290. The setting of a search policy performed by the user through the working copy search policy setting screen is described later in detail with reference to FIG. 13.

The master server information 690 included in the version management client program 600 includes information such as a host name which is necessary for the server 200 to communicate to the master server 300.

Figure 7:
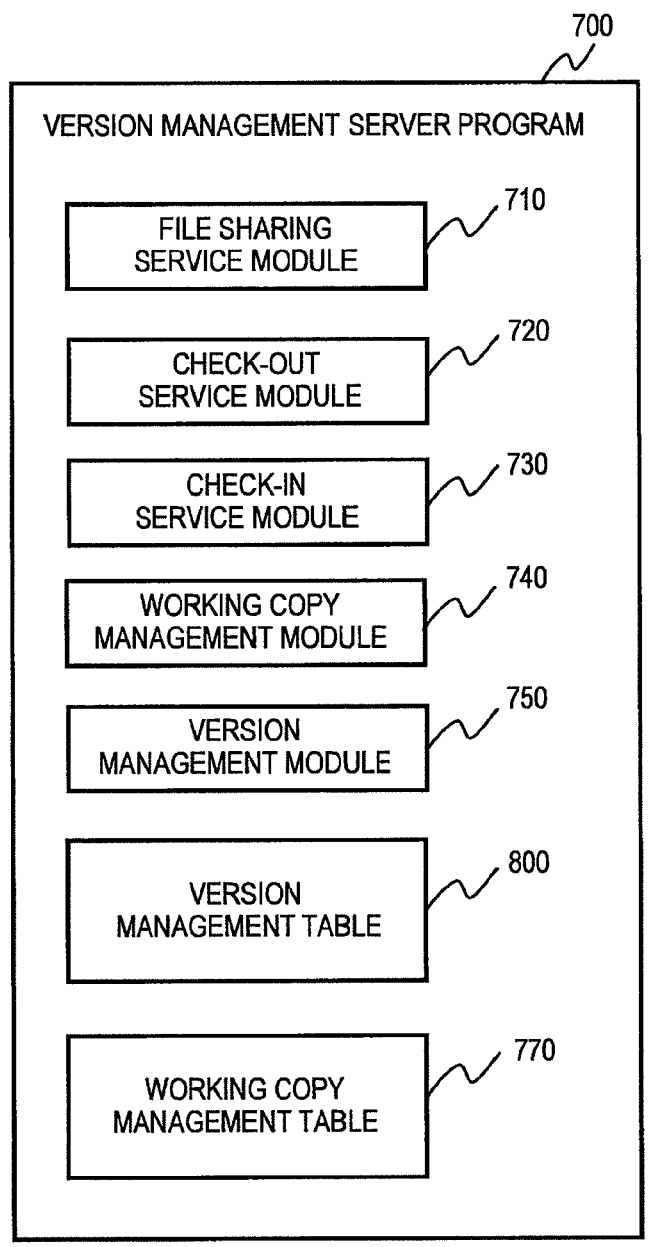
FIG. 7 is a block diagram illustrating an internal configuration of a version management server program in an embodiment of the present invention.

FIG. 7 is a block diagram illustrating a functional configuration of the version management server program 700 of the master server 300. As illustrated in FIG. 7, the version management server program 700 includes a file sharing service module 710, a check-out service module 720, a check-in service module 730, a working copy management module 740, a version management module 750, a version management table 800, and the working copy management table 770.

The file sharing service module 710 is executed by the CPU 310 of the master server 300 with the object acquisition request received from the stub materialization module 610 on the server 200 as a trigger. When receiving the object acquisition request, the file sharing service module 710 returns the object to the stub materialization module 610.

The check-out service module 720 is executed by the CPU 310 of the master server 300 with the check-out request received from the check-out module 620 on the server 200 as a trigger. The check-out service module 720 creates an entry by combining a present date/time with a site ID, a server ID, a repository ID, a version ID, and a working copy ID that are included in the request, and adds the entry to the working copy management table 770. Then, the check-out service module 720 returns the root directory structure information on the requested repository.

The check-in service module 730 is executed by the CPU 310 of the master server 300 with the check-in request received from the check-in module 630 on the server 200 as a trigger. The check-in service module 730 verifies whether or not a conflict occurs based on the list of the objects to be updated which is included in the request. With regard to the verification of the conflict, the working copy management table 770 is referenced to examine whether or not the object is updated at or after the time at which the working copy is checked out. The check-in service module 730 creates a list of the objects causing a conflict and returns the list.

The working copy management module 740 is executed by the CPU 310 of the master server 300 with the working copy management table synchronization request transmitted from the working copy management module 640 or the check-out module 620 on the server 200 as a trigger. The working copy management module 740 synchronizes the working copy management table 770 on the master server 300 and the working copy management table 900 on the server 200.

The working copy management tables 770 and 900 are each a table for managing the working copy 280 checked out to the server 200. The working copy management module 740 transmits the working copy management table 770 on the server 300 to the server 200 of a request source in the synchronization of the working copy management tables.

The version management module 750 is executed by the CPU 310 of the master server 300 with a version creation request received from the version management interface program 290 as a trigger.

The version management module 750 creates a snapshot image as a "version", the snapshot image being obtained by fixing a state of the repository at a point in time of reception of the version creation request. Further, the entry including the repository ID, the version ID, and the present time is created and added to the version management table 800. The version management table 800 is a table for managing the repository on the master server 300 and the version thereof.

Hereinafter, information used by the file system is described with reference to FIGS. 8 to 10. FIG. 8 is a diagram illustrating an example of a structure of the version management table 800. The version management table 800 includes columns of a repository ID 810, a version ID 820, and a creation date/time 830. Those fields form one entry (record).

The repository ID 810 is an identifier of the repository, the version ID 820 is information for identifying the version of the repository, and the creation date/time 830 indicates the date/time at which the version is created. As the identifier, any data such as a name or a numeral may be used for identifying the subject. In this respect, the same applies to other identifiers.

The version management table 800 is, for example, displayed on the terminal 100 through the version management interface program 290. The user selects the version to be checked out from the version management table 800, and checks out the version through the version management interface program 290.

FIG. 9 is a diagram illustrating an example of a structure of the working copy management table 900. The working copy management table 900 includes columns of a site ID 910, a server ID 920, a repository ID 930, a version ID 940, a working copy ID 950, a check-out date/time 960, and the performance information 970. Those fields form one entry (record).

The site ID 910 is information for identifying a site from which the working copy 280 has been checked out, serving as an identifier indicating a location of the server 200. It depends on the design which range is used to identify the location of the server 200. The server ID 920 is information for identifying the server from which the working copy 280 has been checked out. The repository ID 930 is information for identifying the repository being a check-out source of the working copy 280.

The version ID 940 is information for identifying the version of the repository being the check-out source of the working copy 280. The working copy ID 950 is information for identifying the working copy 280 that has been checked out. The check-out date/time 960 indicates a date/time at which the working copy 280 is checked out. The performance information 970 is information indicating the access performance with respect to the working copy 290 that has been checked out.

Any ID may be used as long as each of the IDs is a unique identifier. For example, a country name is used as the site ID, and a host name or an IP address is used as the server ID. Further, a repository name and a version name specified by the user when creating a repository and a version are used as the repository ID and the version ID, respectively. In addition, a path to a check-out destination is used as the working copy ID.

Used as the performance information 970 is, for example, a network response time obtained by executing a ping command on the server 200. This is common among the working copies stored on the same server 200.

The performance information 970 may further include the performance and load situation of the disk drive 260 on which the working copy 290 is stored as detailed information per working copy 290. The access performance represented thereby can indicate different values regarding the working copies on the same server 200. The server 200 can select the working copy 290 whose cache can be acquired with the highest speed based on the performance information 970 per working copy 290.

As described above, the working copy management table 900 gives one entry to each of the working copies. In the working copy management table 900, the entries have working copy IDs different from one another, and each of the entries is uniquely identified by the working copy ID. The entry of the working copy management table 900 includes the repository ID and the version ID but does not include information on the directory and file within the repository. In the working copy management table 900, an entry may be identified uniquely by the pair of the server ID and the working copy ID. In this example, it is enough if the working copy ID is unique in the server 200.

By managing cache information per working copy by the working copy management table, the amount of information for synchronizing the working copy management tables between the servers 200 and 300 is proportionate to the number of working copies that have been checked out. Therefore, even if the number of files to be cached increases, it is possible to reduce the information synchronized between the servers 200 and suppress the network traffic therefor.

Next, FIG. 10 is referenced to describe directory structure information 1000. FIG. 10 is a diagram illustrating an example of a structure of the directory structure information 1000. The directory structure information 1000 is obtained by listing information on files and the directories existing under a given directory in a predetermined format.

The directory structure information 1000 is not only used as a format of the root directory structure information acquired by the check-out module 620 from the master server 300 but also used as a format for the stub materialization module 610 to acquire the directory from the server 200 or the master server 300.

The directory structure information 1000 includes columns of an object ID 1010 for identifying the object, an object name 1020, and an object type 1030. Those fields form one entry (record). The object type 1030 is, for example, "file" or "directory".

FIGS. 8 to 10 have been referenced to specifically describe an example of a part of the information used by this system, but in this embodiment, the information (such as version management table 800, working copy management table 900, directory structure information 1000, and working copy search policy 680) stored in data storage devices (for example, memories 220 and 320 and disk drives 260 and 360) and used by the respective programs may have any kind of data structure. For example, the data structure appropriate for storing the information is selected from a database, a table, a list, or a queue.

Figure 11:
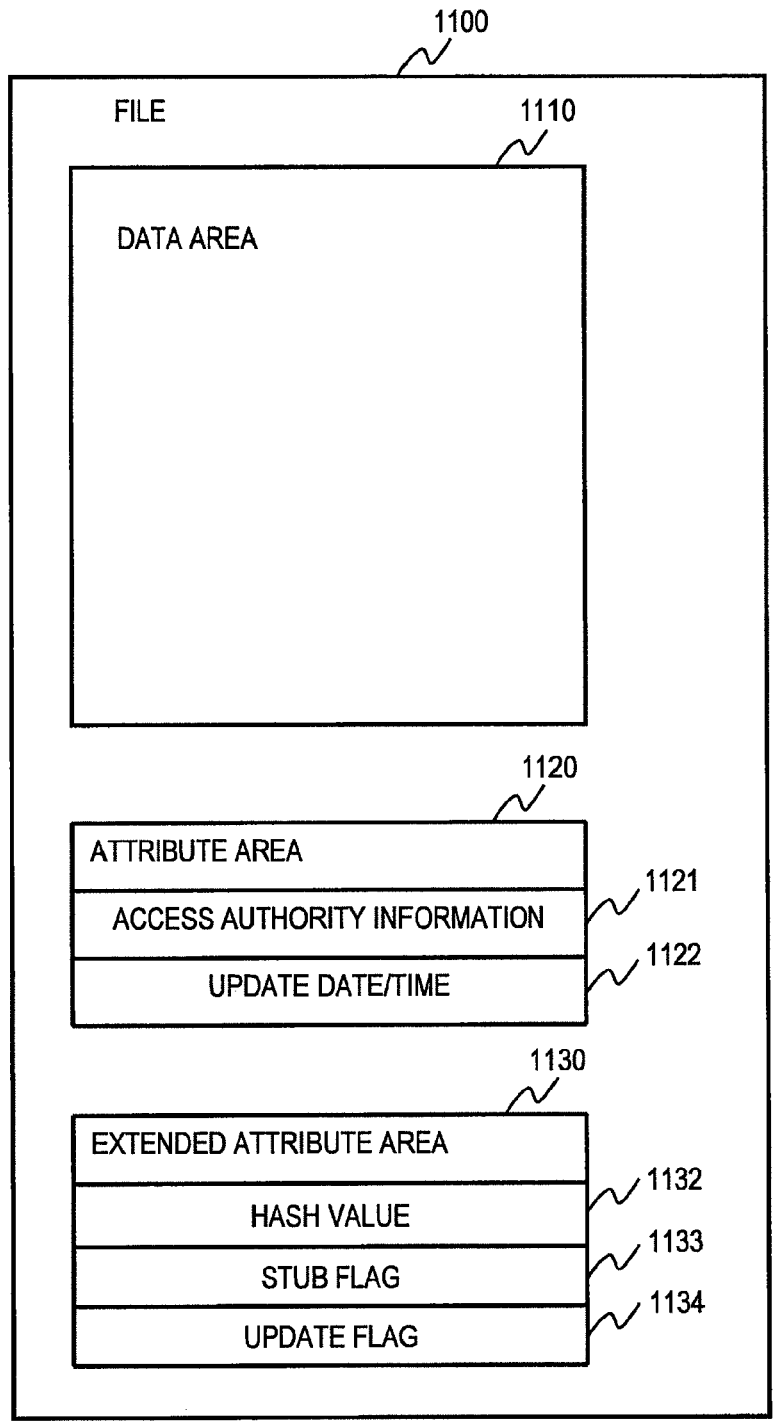
FIG. 11 is a diagram illustrating an internal configuration of a file in an embodiment of the present invention.

FIG. 11 is a diagram illustrating an example of a structure of a file 1100. As illustrated in FIG. 11, the file 1100 includes a data area 1110, an attribute area 1120, and an extended attribute area 1130. The data area 1110 is also referred to as real data, and information (data) within the attribute area 1120 and the extended attribute area 1130 are also referred to collectively as the meta-information (meta-data). The directory also has the same structure as the structure illustrated in FIG. 11.

Store in the data area 1110 is a data main body of the file or directory. It should be noted that the data main body of the file is arbitrary data that is read/written by the user through the application program 285. Further, the data main body of the directory is, for example, the directory structure information 1000. The stub includes only the meta-information (information within areas 1120 and 1130) and the reference information (not shown), and does not include the data main body stored in the data area 1110.

The attribute area 1120 includes the attribute information, such as access authority information 1121 and an update date/time 1122, which is used by the file system program 500. Although not shown, other information may be included therein.

The extended attribute area 1130 includes a hash value 1132, a stub flag 1133, and an update flag 1134. The hash value 1132 is a hash value calculated from the file by using a hash function, and is used by the file sharing service module 650 when processing the cached object presence/absence verifying request in order to facilitate the judgment as to whether or not the files or directories are in agreement with each other. The hash value 1132 is updated by the WRITE processing module 530.

The stub flag 1133 is used by the OPEN processing module 510, the READ processing module 520, and the WRITE processing module 530 in order to determine whether or not the object (file or directory) is in a stub state or a materialized state. If the stub flag 1133 is ON, the object is in the stub state, and if being OFF, the object is the materialized state.

The update flag 1134 is used by the file sharing service module 650 when processing the cached object presence/absence verifying request in order to determine whether or not an update has been made to the object. To update the file, the WRITE processing module 530 changes the update flag 1134 from OFF to ON.

Figure 12:
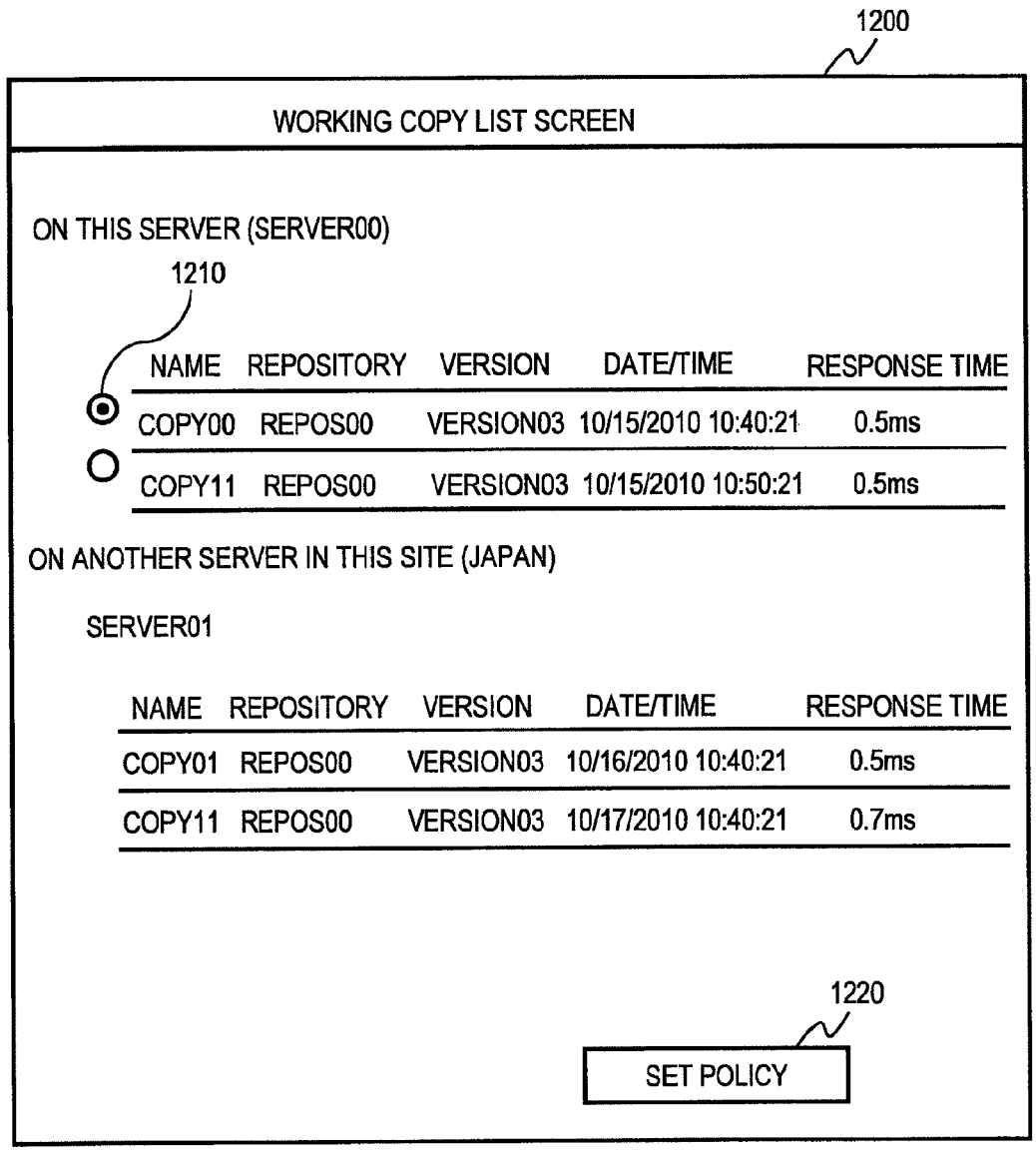
FIG. 12 is a diagram illustrating an example of a working copy list screen in an embodiment of the present invention.

FIG. 12 is a diagram illustrating an example of a working copy list screen 1200 displayed on the terminal 100 by the version management interface program 290 in order to allow the user having the management authority for the repository 380 of the master server 300 to verify the working copy that has been checked out or select the working copy for which the working copy search policy 680 is to be set.

The working copy list screen 1200 includes radio buttons 1210 for exclusively selecting the working copy and a button 1220 for effecting a transition to a working copy search policy setting screen 1300 being a screen for setting the working copy search policy 680.

Figure 13:
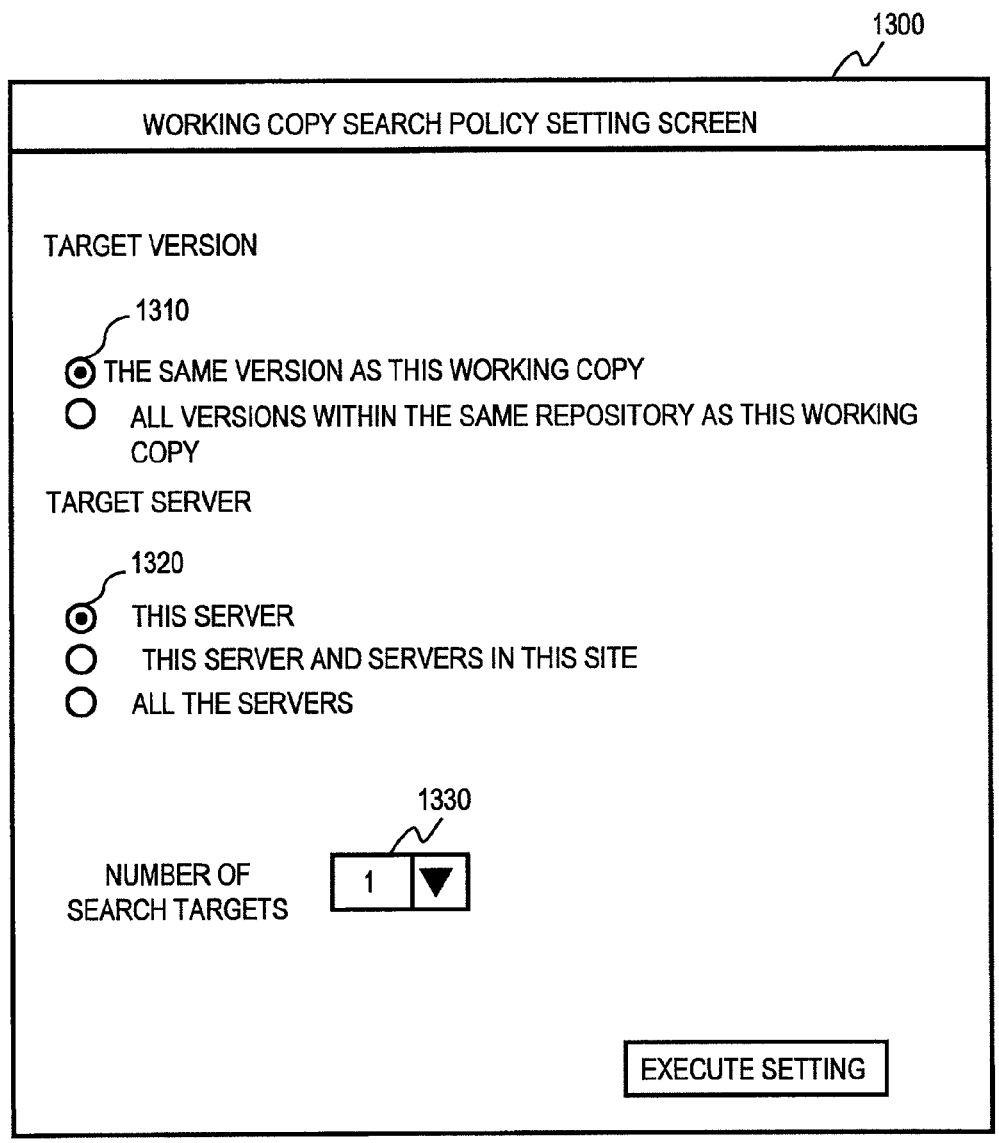
FIG. 13 is a diagram illustrating an example of a working copy search policy setting screen in an embodiment of the present invention.

FIG. 13 is a diagram illustrating an example of the working copy search policy setting screen 1300 displayed on the terminal 100 by the version management interface program 290 in order to allow the user having the management authority for the repository 380 of the master server 300 to set the working copy search policy 680.

The working copy search policy setting screen 1300 includes radio buttons 1310 for exclusively selecting the version as the search range in the searching of the working copy management table performed by the stub materialization module 610, radio buttons 1320 for exclusively selecting the server as the search range, and a pull-down list 1330 for selecting a number as the search range (number of servers to be searched).

Hereinafter, FIGS. 14 to 19 are referenced to describe processings performed by the system (server 200) according to this embodiment to check out the working copy from the master server 300 that provides a file service, read/write a file, and perform the checking in.

First described is an outline of the processings. The server 200 checks out a specified snapshot (version) of the specified repository according to the user's specification. The server 200 adds the entry including the site ID, the server ID, the repository ID, a snapshot ID, and the working copy ID to the working copy management table 770, and updates the working copy management table 900 of its own by the working copy management table 770. After that, the server 200 creates the stub in the root directory of the working copy.

After that, when receiving the READ request, the server 200 performs a READ processing as it is if a target file exists in the working copy stored on the own server as the materialized file. If the target file exists in the working copy stored on the own server as the stub file, the server 200 references the working copy management table 900 to, for example, make a search as to whether or not there is a cache of the file on another server including the working copy that has been checked out from the same repository.

The server 200 uses the working copy management table 900 to manage as to which server 200 at which location retains the working copy (set of files and directories that have been checked out) of which snapshot (version) of which repository. The server 200 decides a destination to be queried regarding the presence/absence of the cache based on the information of the working copy management table 900.

If the cache exists, the server 200 uses the cache to perform on-demand copy. If the cache does not exist, the server 200 performs the on-demand copy from the snapshot on the master server 300. To verify whether or not the cache exists, the server 200 of the destination from which the query is to be made verifies whether or not the file is updated.

A WRITE processing performed on the WRITE request is the same as the READ processing in terms of searching the cache and performing the on-demand copy. The file is updated unlike the READ processing, and hence the server 200 updates the update flag and the hash value.

In a check-in processing, the server 200 lists only the changed files and copies the file to the master server 300. The server 200 sends the changed file list to the master server 300. The master server 300 performs a comparison with the changed file list sent from another working copy and displays an alert when a conflict occurs, and the user manually merges the files.

Figure 14:
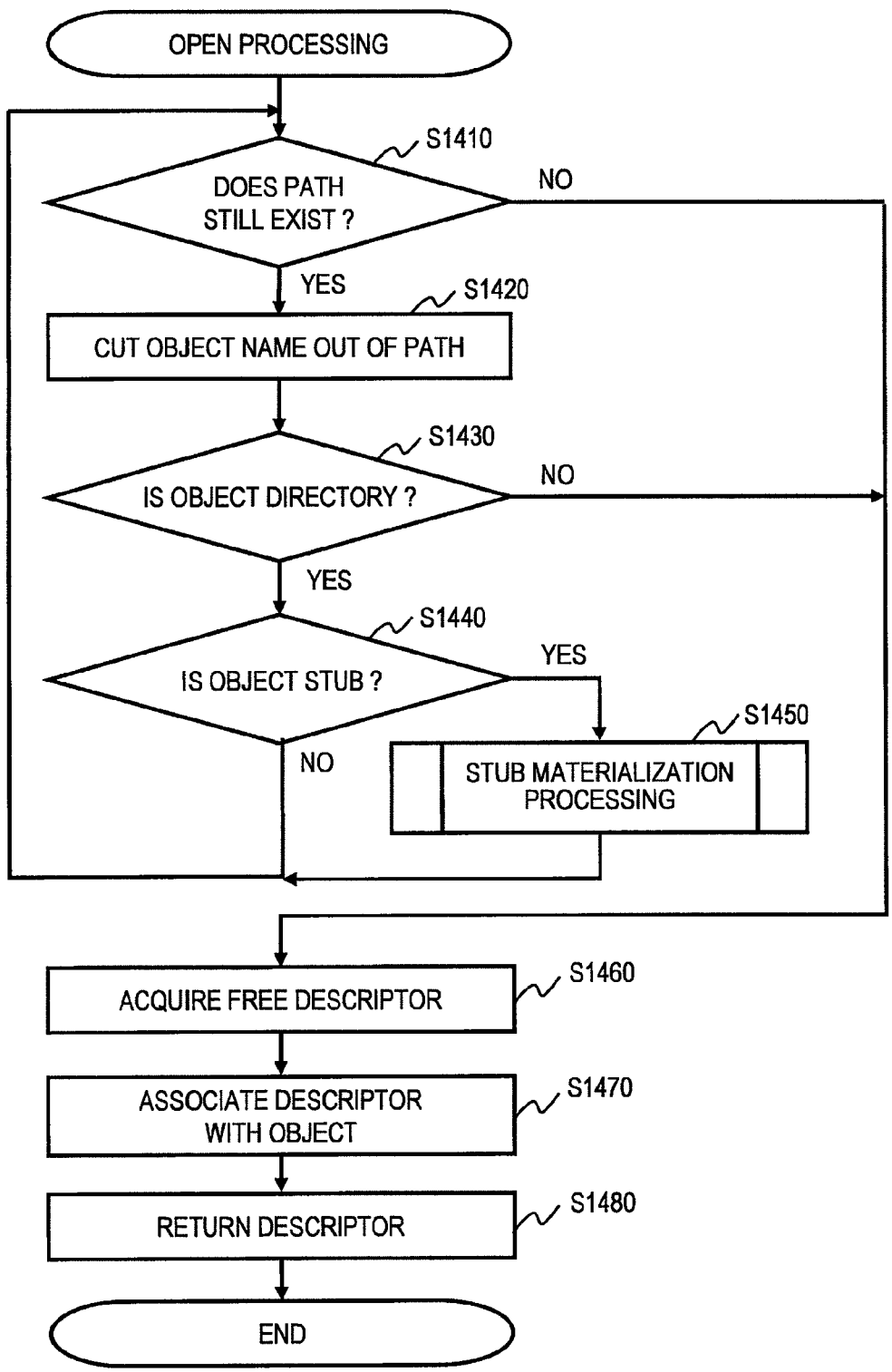
FIG. 14 is an example of a processing executed by an OPEN processing module in an embodiment of the present invention.

Hereinafter, flowcharts of FIGS. 14 to 19 are referenced to describe the specific processings of the respective programs. FIG. 14 is an example of the flowchart for describing details of an OPEN processing executed by the OPEN processing module 510 (in cooperation with the CPU 210). The OPEN processing module 510 is executed by the file system program 500 when an OPEN processing request is received from the application program 285. The OPEN processing request is, for example, an OPEN system call in a UNIX-based operating system. The OPEN processing request includes a path to the object to be opened.

First, the OPEN processing module 510 examines whether or not a path to a processing target still exists (S1410). If the path to an analysis target still exists (if YES in S1410), the object name at the top is cut out of the path (S1420).

For example, if the object having a path of "/MNT/FS00/DIR/FILE" is the processing target, the object names are "/" (root directory), "MNT/", "FS00/", "DIR/", and "FILE" in order from the top. The object name to be cut out is "/" (root directory), and the remaining path is "MNT/FS00/DIR/FILE".

Then, the OPEN processing module 510 verifies whether or not the object cut out in Step S1420 is a directory (S1430). If the object is a directory (if YES in S1430), the OPEN processing module 510 further verifies whether or not the object is in the stub state (S1440). The OPEN processing module 510 examines the stub flag 1133 within the extended attribute area 1130 of the file 1100 in order to verify whether or not the object is in the stub state.

If the object is in the stub state (if YES in S1440), the OPEN processing module 510 specifies the path to the object to perform the stub materialization processing (S1450), and materializes the stub-state object. The stub materialization processing is described later in detail.

If the object is not in the stub state (if NO in S1440), the processing again shifts to Step S1410, in which it is checked whether or not the path to the processing target exists. For example, in a stage in which "/" (root directory) has been cut out of the path of "/MNT/FS00/DIR" in Step S1420, the path of "MNT/FS00/DIR." remains, and hence Step S1410 results in YES again, thereby continuing the processing. On the other hand, in a stage in which all the elements of "/" (root directory), "MNT/", "FS00/", and "DIR" have been cut out, the path to the processing target no longer exists, and hence Step S1410 results in NO.

If the path to the processing target does not exist (if NO in S1410), and if the cut-out object is not a directory (if NO in S1430), the OPEN processing module 510 acquires a free descriptor (S1460). The descriptor is an identifier that allows the file system program 500 to manage the file or directory that has been opened.

The application program 285 specifies the descriptor to perform the READ processing and the WRITE processing. The descriptor is, for example, a finite integer. Further, the free descriptor is the identifier that is not assigned to any other file or directory that has been opened.

Then, after associating the free descriptor acquired in Step S1460 and the last object cut out in Step S1420 (S1470), the OPEN processing module 510 returns the descriptor to the application program 285 that has requested the OPEN processing (S1480). In a case of, for example, the path of "/MNT/FS00/DIR", the last object cut out in Step S1420 is a "DIR" directory. Further, in a case of the path of "/MNT/FS00/DIR/FILE", the last object is a "FILE" file.

Figure 15:
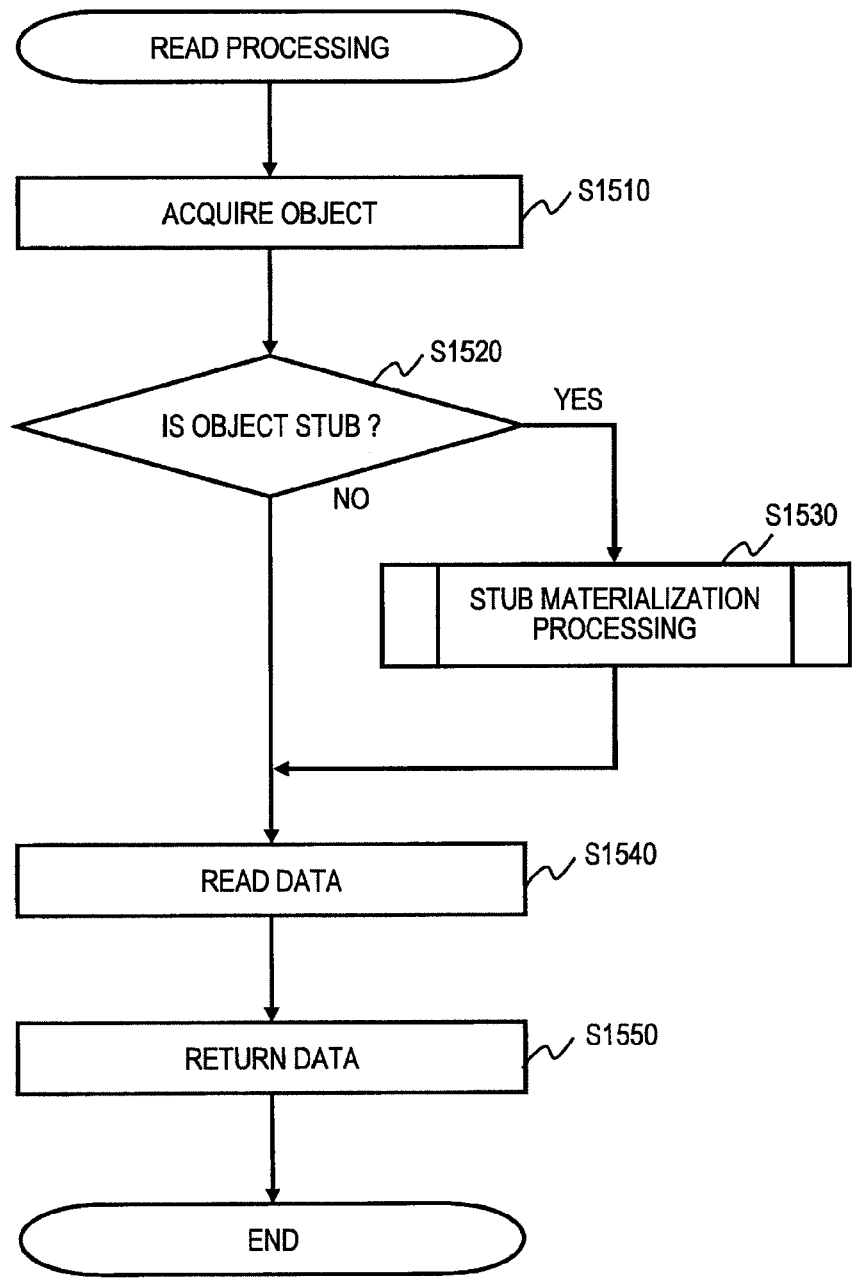
FIG. 15 is an example of a processing executed by a READ processing module in an embodiment of the present invention.

FIG. 15 is an example of the flowchart for describing details of the READ processing executed by the READ processing module 520 (in cooperation with the CPU 210). The READ processing module 520 is executed by the file system program 500 when a READ processing request is received from the application program 285. The READ processing request is, for example, a READ system call in a UNIX-based operating system. The READ processing request includes the descriptor acquired in advance by the OPEN processing request and a data size to be read.

First, the READ processing module 520 acquires the object corresponding to the descriptor included in the READ processing request (S1510). Then, it is checked whether or not the acquired object is in the stub state (S1520).

If the object is in the stub state (if YES in S1520), the READ processing module 520 specifies the path to the object to perform the stub materialization processing (S1530), and materializes the stub-state object. The stub materialization processing is described later in detail.

If the object is not in the stub state (if NO in S1520), or after the stub materialization processing is finished (after S1530), the READ processing module 520 reads data having a size specified by the READ processing request from the data area 1110 of the file 1100, and updates offset information to the read position (S1540). The offset information is positional information for managing as to which extent the file has been read/written to, and is information internally managed by the file system program 500.

Then, the READ processing module 520 returns the data read in Step S1540 to the application program 285 that has requested the READ processing (S1550).

Figure 16:
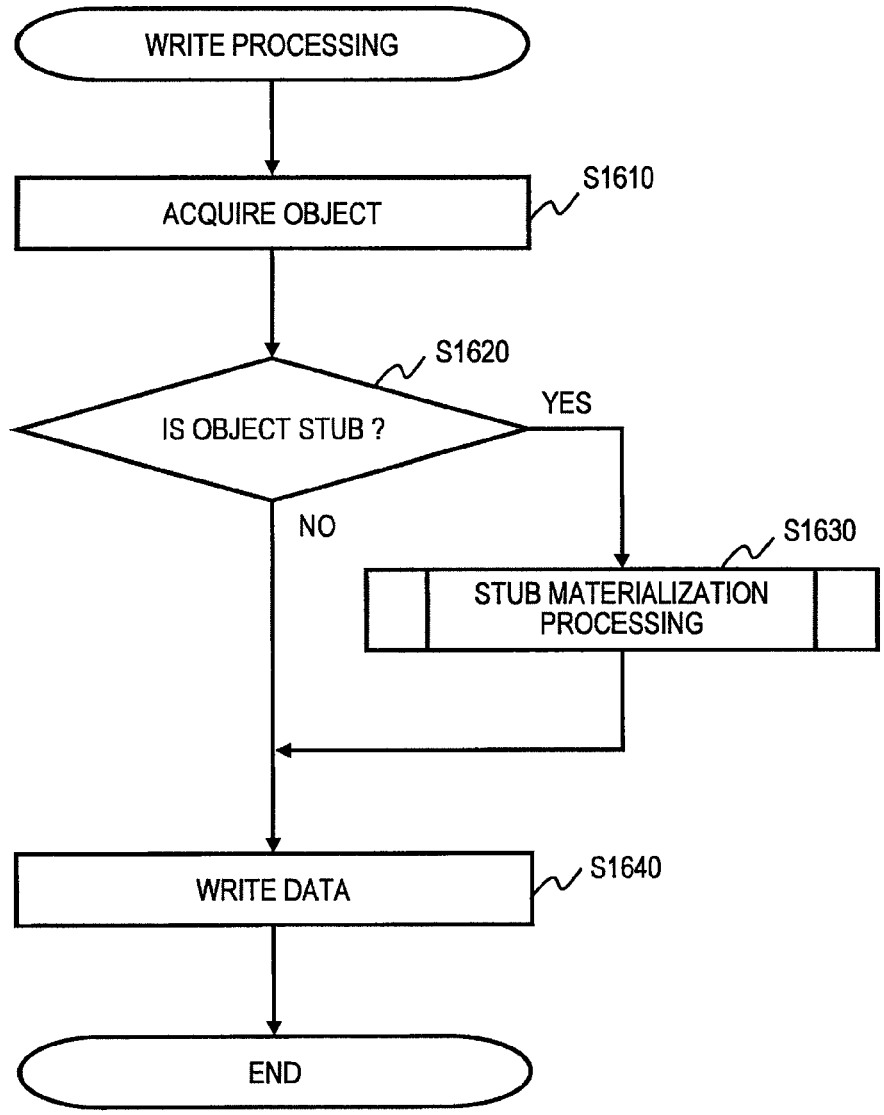
FIG. 16 is an example of a processing executed by a WRITE processing module in an embodiment of the present invention.

FIG. 16 is an example of the flowchart for describing details of the WRITE processing executed by the WRITE processing module 530 (in cooperation with the CPU 210).

The WRITE processing module 530 is executed by the file system program 500 when a WRITE processing request is received from the application program 285. The WRITE processing request is, for example, a WRITE system call in a UNIX-based operating system. The WRITE processing request includes the descriptor acquired in advance by the OPEN processing request, data to be written, and a data size.

First, the WRITE processing module 530 acquires the object corresponding to the descriptor included in the WRITE processing request (S1610). Then, the WRITE processing module 530 verifies whether or not the acquired object is in the stub state (S1620).

If the object is in the stub state (if YES in S1620), the WRITE processing module 530 specifies the path to the object to perform the stub materialization processing (S1630), and materializes the stub-state object. The stub materialization processing is described later in detail.

If the object is not in the stub state (if NO in S1620), or after the stub materialization processing is finished (after S1630), the WRITE processing module 530 writes the data specified by the WRITE processing request to the data area 1110 of the file 1100 by the specified size, and updates the offset information to the written position (S1640). In addition, the WRITE processing module 530 also updates the hash value 1132 and the update flag 1134 when writing the data.

Figure 17:
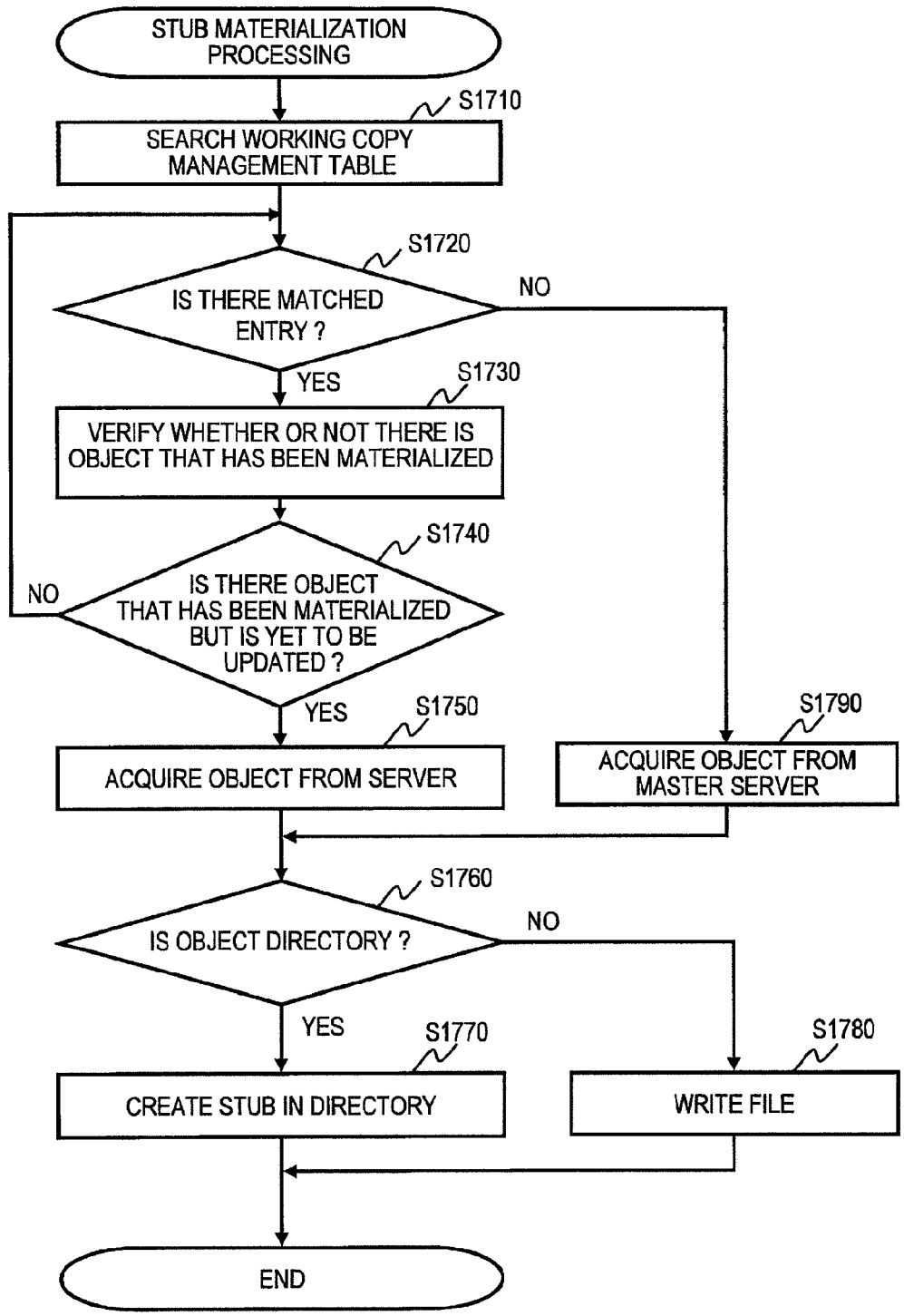
FIG. 17 is an example of a processing executed by a stub materialization module in an embodiment of the present invention.

FIG. 17 is a flowchart for describing details of the stub materialization processing (S1450, S1530, and S1630) of FIGS. 14 to 16. First, each of the OPEN processing module 510, the READ processing module 520, and the WRITE processing module 530 (hereinafter, each of the file system modules) searches the working copy management table 900 based on the working copy search policy 680 (S1710).

The working copy search policy 680 stores, for example, a search policy instructing to "search for the working copy within the same repository, of the same version, and in the same site as the working copy to which the object to be materialized belongs".

Description is made of an example of materializing the file of "/MNT/COPY00/MJFILE" on the server SERVER00 in a case where such a working copy search policy is set. "/MNT/COPY00/DIR/FILE" is found to be a file present in the working copy whose working copy ID is "/MNT/COPY00" according to its path.

In the working copy management table 900, the working copy within the same repository (REPOS00), of the same version (VERSION03), and in the same site (JAPAN) as the working copy "/MNT/COPY00" is the working copy which is stored on the server SERVER01 and whose working copy ID 950 is "/MNT/COPY01".

Subsequently, each of the file system modules verifies whether or not there is a matched entry as a result of performing the search in Step S1710 (S1720). If there is a matched entry (if YES in S1720), each of the file system modules issues a cache presence/absence verifying request including a path derived from the path to the object and the working copy ID 950 to the file sharing service module 650 on the server 200 indicated by the server ID 920 of the entry, and verifies whether or not there is an object which has been materialized but is yet to be updated and which can be used as the cache of the object (S1730).

For example, if the working copy ID 950 is "/MNT/COPY01" and if the path to the object to be materialized is "/MNT/COPY00/DIR/FILE", each of the file system modules specifies "/MNT/COPY01/DIR/FILE" as the path in which the cache can exist, and makes a query to the file sharing service module 650. The file sharing service module 650 references the stub flag 1133 and the update flag 1134 of the object present in a specified object path to verify whether or not the object has been materialized but is yet to be updated.

It should be noted that in the case of verifying the presence/absence of the cache, each of the file system modules may include the hash value 1132 of the object to be materialized in the cache presence/absence verifying request, and the file sharing service module 650 may compare the hash value and the hash value 1132 of the object present in the specified object path to thereby verify whether or not the object is yet to be updated. Alternatively, the file sharing service module 650 may compare the check-out date/time 960 of the entry within the working copy management table 900 and the update date/time 1122 to thereby verify whether or not the object is yet to be updated.

If there is an object that has been materialized but is yet to be updated as a result of the verification of the presence/absence of the cache performed in Step S1730, in other words, if a response of "cache present" is received from the file sharing service module 650 (if YES in S1740), each of the file system modules issues the object acquisition request with the path in which the cache exists being specified to the file sharing service module 650 on the server that retains the caches to thereby acquire the object (S1750).

If there is no object that has been materialized but is yet to be updated as a result of the verification of the presence/absence of the cache performed in Step S1730, in other words, if a response of "cache absent" is received from the file sharing service module 650 (if NO in S1740), the processing again shifts to S1720, in which each of the file system modules examines whether or not there is an entry for which the presence/absence of the cache has not been verified among the entries found in Step S1710. If there is such an entry, each of the file system modules again verifies the presence/absence of the cache based on the entry.

In other words, each of the file system modules successively selects the entry matched in Step S1710 and keeps verifying the presence/absence of the cache until the cache is found. It should be noted that each of the file system modules may simultaneously verify the presence/absence of the cache for all the entries instead of successively checking the presence/absence of the cache for the matched entries as described above. In that case, each of the file system modules issues the object acquisition request to the server 200 being the first to return "cache present".

If there is no matched entry as a result of the search performed in Step S1710, or if there is no cache found after checking the presence/absence of the cache for all the matched entries (if NO in S1720), each of the file system modules issues the object acquisition request to the file sharing service module 710 on the master server 300 based on the master server information 690 to thereby acquire the object (S1790).

The object acquisition request includes the repository ID 930, the version ID 940, and the path to the object on the master server 300, which has been derived from the path to the object to be materialized.

When the object is acquired by the processing of Step S1750 or S1790, each of the file system modules verifies whether or not the object to be materialized is a directory (S1760).

If the object is a directory (if YES in S1760), each of the file system modules materializes the directory by creating the stub-state object under the directory to be materialized based on the directory structure information 1000 on the acquired object (S1770). For example, if the acquired structure information is the directory structure information 1000 of FIG. 10, each of the file system modules creates two files respectively named "obj00" and "obj01" and a directory named "obj02" in the stub state.

If the object is not a directory (if NO in S1760), each of the file system modules materializes the file by writing the data within the data area 1110 of the acquired object to the data area 1110 of the stub-state object (S1780).

Figure 18:
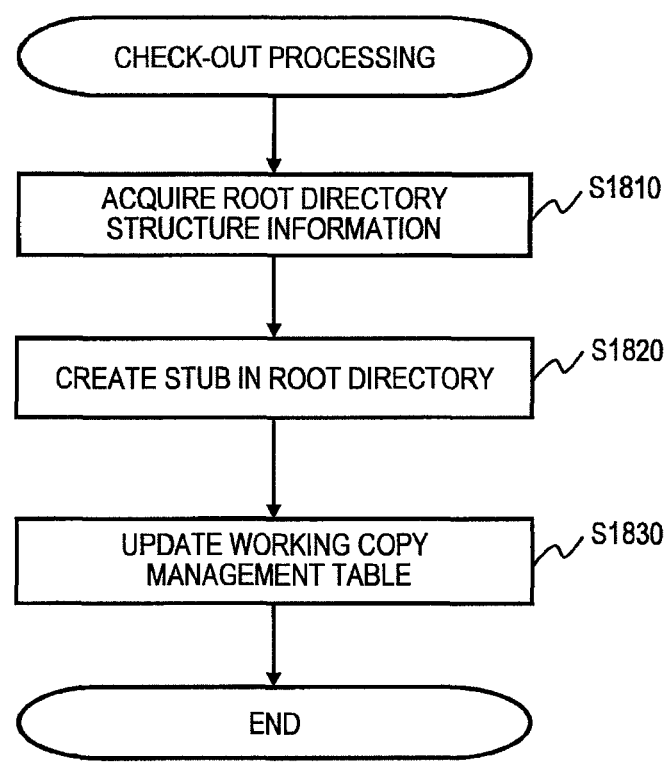
FIG. 18 is an example of a processing executed by a check-out module in an embodiment of the present invention.

FIG. 18 is an example of the flowchart for describing details of a check-out processing executed by the check-out module 620 (in cooperation with the CPU 210). The check-out module 620 is executed by the version management client program 600 when the check-out request is received from the version management interface program 290. The check-out request includes the site ID of the server including the check-out module 620, the server ID thereof, the repository ID of a check-out target, the version ID thereof, and the working copy ID thereof.

First, the check-out module 620 issues the check-out request to the check-out service module 720 on the master server 300 based on the master server information 690, and acquires the directory structure information 1000 on the root directory of the desired repository/version (S1810).

At this time, the check-out service module 720 creates an entry by combining the present date/time with the site ID, the server ID, the repository ID, the version ID, and the working copy ID that are included in the check-out request, and adds the entry to the working copy management table 770 on the master server 300. Then, the check-out service module 720 returns the root directory structure information on the requested repository.

Subsequently, the check-out module 620 creates the root directory of the working copy in the path specified by the working copy ID, and creates a stub-state object in the root directory based on the directory structure information 1000 acquired in Step S1810 (S1820).

The check-out module 620 issues the working copy management table synchronization request to the working copy management module 740 on the master server 300, and synchronizes the working copy management table 770 on the master server 300 and the working copy management table 900 on the server 200 (S1830).

Figure 19:
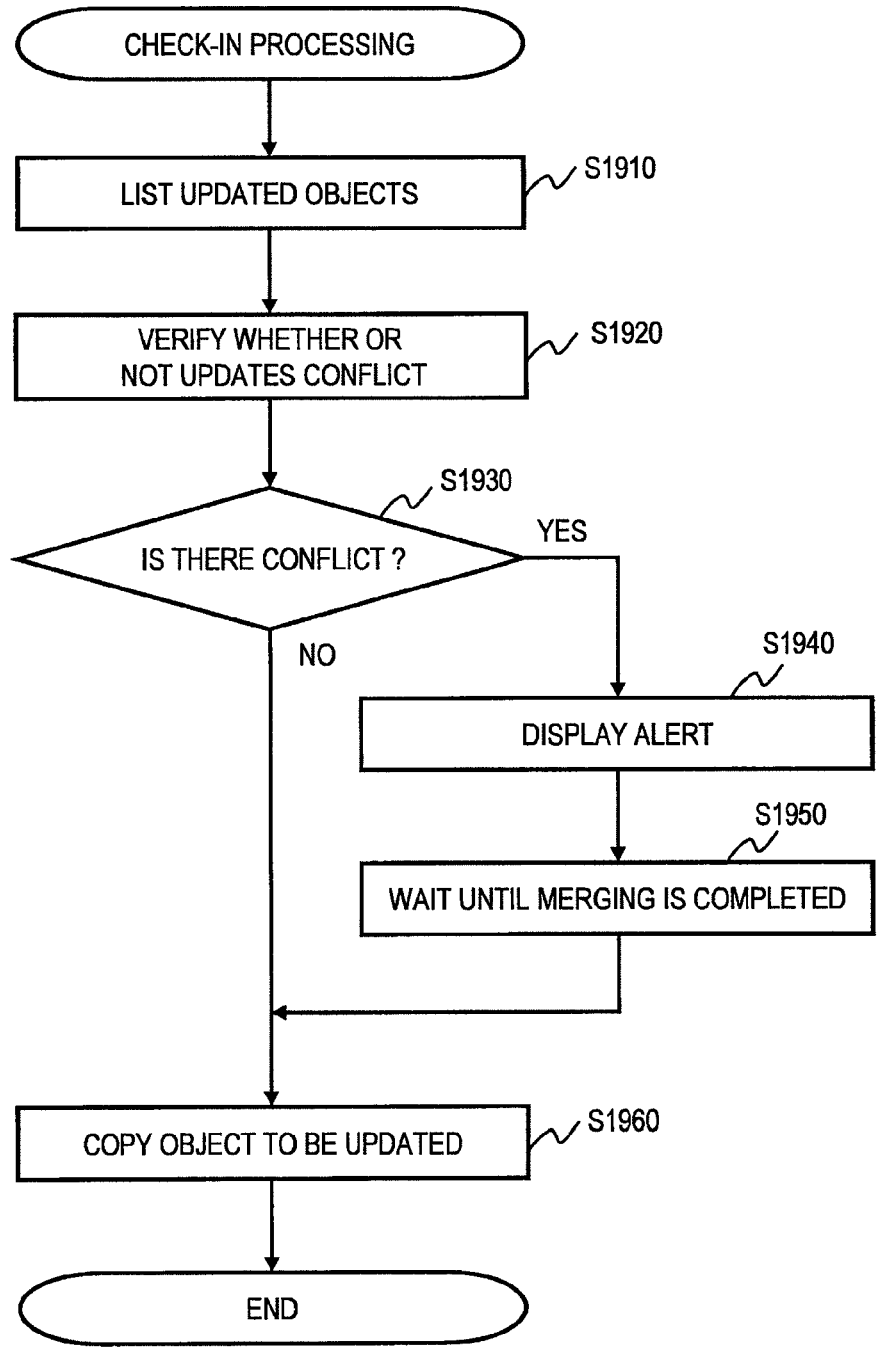
FIG. 19 is an example of a processing executed by a check-in processing module in an embodiment of the present invention.

FIG. 19 is an example of the flowchart for describing details of the check-in processing executed by the check-in processing module 630 (in cooperation with the CPU 210). The check-in processing module 630 is executed by the version management client program 600 when a check-in processing request is received from the version management interface program 290. The check-in processing request includes the working copy ID of a working copy to be checked in and the repository ID of a check-in destination.

First, the check-in module 630 creates a list of updated objects from a directory tree of the working copy indicated by the working copy ID (S1910). Subsequently, the check-in module 630 issues the check-in request to the check-in service module 730 on the master server 300 based on the master server information 690, and verifies whether or not there is a conflict (S1920). The check-in request includes the list of updated objects created in Step S1910.

As a response to the check-in request issued in Step S1920, if the list of conflicted objects is obtained (if YES in S1930), the check-in module 630 presents an alert to the user via the version management interface program 290 (S1940).

Then, the user performs merging work for resolving the conflict, and the check-in module 630 waits until completion of the merging work is notified of via the version management interface program 290 (S1950). Finally, the check-in module 630 copies the object to be updated which includes the objects merged by the user to the target repository on the master server 300 (S1960).

As a response to the check-in request issued in Step S1920, if the list of conflicted objects is not obtained (if NO in S1930), the check-in module 630 copies the object to be updated to the target repository on the master server 300 (S1960).

According to this embodiment described above, in the working copy being the copied file system, the object necessary in the working copy for the user can be specified by the stub by using the stub that does not have the entity information and the working copy management table 900, and the system can efficiently discover the cache of the specified object by the working copy management table 900 with the small number of times to make a query.

As described above, by distributed caching using the stub and the working copy management table, the user can acquire data necessary in the working copy with higher speed. In addition, the working copy management table manages cache data per working copy, and hence it is possible to reduce the size of the working copy management table for cache management and reduce the amount of transfer information for synchronizing the tables among the servers (including the master server).

The embodiment of this invention has been described above, but this invention is not limited to the above-mentioned embodiment. Changes, addition, and conversion can be easily made to the respective components of the above-mentioned embodiment by those skilled in the art within the scope of this invention.

For example, the example where the user logs in to the server 200 from the terminal 100 and directly reads/writes the checked-out working copy has been described, but the file sharing service module 650 on the server 200 may provide a file sharing function conforming to a network file system (NFS) protocol or a common Internet file system (CIFS) protocol to share a working copy among a plurality of terminals. In that case, the check-in and check-out operations are carried out by the user who manages the working copy.

As the stub materialization processing, the example of acquiring data per object from the server 200 or the master server 300 has been described, but a necessary portion of data may be acquired, for example, per block based on the offset information on the file retained by the file system program 500 and the size of a reading/writing target included in the READ processing request or the WRITE processing request.

As described above, it is preferred that the entries within the working copy management table correspond to working copies on a one-to-one basis, but the working copy management table may include a plurality of entries corresponding to a working copy. For example, by adding a field for identifying the directory or file, the entries for the same working copy can store different values in the field. If such a field exists, a field indicating whether or not an update has been made to the corresponding object.

The repository ID and the server ID can be used to identify the destination from which the cache of the object is to be queried. Therefore, the working copy management table does not necessarily include the version ID, the working copy ID, and other fields. As described above, it is preferred that the version ID be included in order to reduce the number of times to make a query.

In the above-mentioned configuration, the master server 300 includes a master table of the working copy management table, which is copied by the server 200. With the master server 300 including the master table, it is possible to perform synchronization management of the working copy management table more appropriately and to reduce the amount of data transfer for synchronization which occurs between the respective servers. Alternatively, a synchronization processing for the working copy management table may be performed between the respective servers 200.

The above-mentioned configuration includes only one master server, but this invention can be applied to a system including a plurality of master servers, and can be further applied to a system including one server and one or a plurality of master servers.

In the above-mentioned configuration, the working copy includes the root directory of the repository, but the working copy may be the file system with the directory under the root directory being set as the top directory. For example, the user specifies the specific directory of the repository as the top directory in the checking out.

This invention is suitable for the file system having the version management function as described above, but can be applied to a different file system. For example, this invention may be applied to system in which the user can acquire only a copy of the file system from the master server and the master server does not receive update data.

With regard to the above-mentioned respective components, functions, processings, processing modules, and the like, a part thereof may be realized by hardware. The information including the program and data for realizing the respective functions can be stored in a storage device such as a nonvolatile semiconductor memory, a hard disk, or a solid state drive (SSD) or a computer-readable non-temporary storage medium such as an IC card, an SD card, or a DVD.

REFERENCE SIGNS LIST 100A, 100B: Terminal, 200: Server, 270: File system, 280: Working copy, 300: Master server, 370: File system, 380: Repository, 390: File system program, 400A, 400B, 400C: Working copy management table, 500: File system program, 510: Open processing module, 520: Read processing module, 530: Write processing module, 600: Version management client program, 610: Stub materialization module, 620: Check-out module, 630: Check-in module, 640: Working copy management module, 650: File sharing service module, 680: Working copy search policy, 690: Master server information, 700: Version management server program, 710: File sharing service module, 720: Check-out service module, 730: Check-in service module, 740: Working copy management module, 750: Version management module, 770: Working copy management table, 800: Version management table, 900: Working copy management table

The invention claimed is:

1. A file sharing system comprising:
a master server configured to provide one or more master file systems each including a directory and a file each being an object; and
slave servers each configured to acquire a copy file system of a part or whole of a master file system provided by the master server, wherein:
a first slave server of the slave servers includes copy management information including entries each associating a master file system identifier, an identifier of a version of a master file system identified by the master file system identifier and an identifier of a slave server which checked out of a copy file system of a part or whole of the master file system identified by the master file system identifier;
the first slave server acquires a first copy file system of a part of a first master file system in the one or more master file systems, the first copy file system including a stub-state object;
the first slave server, using an identifier of the first master file system and an identifier of a version of the first master file system, searches the copy management information for a slave server to be queried regarding cached information for materializing the stub-state object and performs the searches simultaneously to verify the presence or absence of the cached information and issues an object acquisition to the slave server being the first to return a cache present designation, and the number of slave servers to be queried being based on a version of the copy management information;
on condition that the search result indicates a slave server to be queried of the slave servers, the first slave server queries the slave server to be queried regarding the cached information for materialization;
on condition that the slave server to be queried includes the information for materialization, the first slave server materializes the stub-state object using the information for materialization acquired from the slave server to be queried; and
the first slave server synchronizes the copy management information thereon and other copy management information on one of the master server and the slave servers in a checkout process of the first copy file system;
wherein, on condition that the information for materialization is not acquired from any slave server in the copy management information, the first slave server acquires the information for materialization from the master file server of the first master file system.

2. The file sharing system according to claim 1, wherein an entry of the copy management information comprises the master file system identifier, the slave server identifier and an identifier to identify a copy file system; and
a single entry is assigned to one copy file system in the copy management information.

3. The file sharing system according to claim 2, wherein the first copy file system of the first slave server is a working copy of the first master file system; and
the first slave server copies an object updated in the working copy to the first master server.

4. The file sharing system according to claim 3, wherein
the slave server to be queried is associated with a master file system of which version is the same as the version of the first master file system in the copy management information.

5. The file sharing system according to claim 4, wherein the slave server to be queried returns a response indicating that the slave server to be queried does not include the information for materialization on condition that the queried object has been updated.

6. The file sharing system according to claim 5, wherein the master server includes master copy management information;
each of the one or more slave servers includes copy management information as a copy of the master copy management information; and
each of the one or more slave servers adds an entry to the master copy management information for an acquired copy file system of a part or whole of a master file system.

7. The file sharing system according to claim 6, wherein the first slave server includes a user-settable search policy defining range of the searching; and the first slave server searches the copy management information for the slayer server to be queried within the search range defined by the search policy.

8. The file sharing system according to claim 7, wherein the copy management information further includes information indicating a location of a slave server; and
    the first slave server refers to the location information to determine the slave server to be queried.

9. The file sharing system according to claim 8, wherein the copy management information further includes performance information associated with the copy file system identifier and indicating access performance to a copy file system identified by the copy file system identifier; and
    the first slave server refers to the performance information to determine the slave server to be queried.

10. The file sharing system according to claim 9, wherein the first slave server makes the query to the first slave server on condition that the search result indicates the first slave server as the slave server to be queried.

11. A file sharing method, in a computer system comprising a master server configured to provide one or more master file systems each including a directory and a file each being an object, and slave servers each configured to acquire a copy file system of a part or whole of a master file system provided by the master server, for a first slave server to acquire a copy file system of a part or whole of a master file system in the one or more master file systems, the file sharing method comprising:
    acquiring, by the first slave server, a first copy file system of a part of a first master file system, the first copy file system including a stub-state object,
    referring to, by the first slave server, copy management information including entries each associating a master file system identifier, an identifier of a version of a master file system identified by the master file system identifier and an identifier of a slave server which checked out of a copy file system of a part or whole of the master file system identified by the master file system identifier,
    using, by the first slave server, an identifier of the first master file system and an identifier of a version of the first master file system, and searching the copy management information for a slave server to be queried regarding cached information for materializing the stub-state object, and performing the searches simultaneously to verify the presence or absence of the cached information and issuing an object acquisition to the slave server being the first to return a cache present designation, and the number of slave servers to be queried being based on a version of the copy management information;
    receiving, by the first slave server, a query regarding information for materializing the stub-state object; and
    returning, by the first slave server, a response indicating that the first slave server does not include the information for materialization on condition that the queried object has been updated;
    on condition that the search result indicates a slave server to be queried of slave servers, querying, by the first slave server, the slave server to be queried regarding the cached information for materialization;
    on condition that the slave server to be queried includes the information materialization, materializing, by the first slave server, the stub-state object using the information for materialization acquired from the slave server to be queried; and
    the first slave server synchronizes the copy management information thereon and other copy management information on one of the master server and the slave servers in a checkout process of the first copy file system.

12. The file sharing method according to claim 11 further comprising:
    referring to, by the first slave server, a user-settable search policy defining range of the searching; and
    searching, by the first slave server, the copy management information for the slayer server to be queried within the search range defined by the search policy.

13. The file sharing method according to claim 11, wherein the copy management information further includes information indicating a location of a slave server; and
    the location information is referred by the first slave server to determine the slave server to be queried.

\* \* \* \* \*